US010573302B2

(12) United States Patent
Lee et al.

(10) Patent No.: US 10,573,302 B2
(45) Date of Patent: Feb. 25, 2020

(54) TERMINAL AND HOME APPLIANCE SYSTEM INCLUDING THE SAME

(71) Applicant: LG ELECTRONICS, INC., Seoul (KR)

(72) Inventors: Juwan Lee, Seoul (KR); Daegeun Seo, Seoul (KR); Jihyun Song, Seoul (KR); Lagyoung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/065,463

(22) Filed: Mar. 9, 2016

(65) Prior Publication Data

US 2016/0267910 A1 Sep. 15, 2016

(30) Foreign Application Priority Data

Mar. 13, 2015 (KR) ........................ 10-2015-0035007

(51) Int. Cl.
G10L 15/22 (2006.01)
G06F 16/951 (2019.01)

(52) U.S. Cl.
CPC ............ G10L 15/22 (2013.01); G06F 16/951 (2019.01)

(58) Field of Classification Search
CPC ................................ G10L 15/22; G10L 17/22
USPC ......................................................... 704/275
See application file for complete search history.

(56) References Cited

U.S. PATENT DOCUMENTS

| | | | |
|---|---|---|---|
| 6,947,731 B1 * | 9/2005 | Kamperschroer | H04L 29/06 340/426.13 |
| 8,433,719 B1 | 4/2013 | Choc | |
| 8,504,410 B2 * | 8/2013 | Pasta | G06Q 30/02 705/14.27 |
| 2002/0163534 A1 * | 11/2002 | Choi | G06F 16/95 715/734 |
| 2004/0010564 A1 * | 1/2004 | Imaida | G06Q 30/02 709/217 |
| 2011/0252071 A1 * | 10/2011 | Cidon | G06F 16/178 707/802 |

(Continued)

FOREIGN PATENT DOCUMENTS

| | | |
|---|---|---|
| EP | 3021319 A1 | 5/2016 |
| WO | 01/35390 A1 | 5/2001 |
| WO | 2011/059258 A2 | 5/2011 |

OTHER PUBLICATIONS

Rich et al., "DiamondHelp: A Collaborative Interface Framework for Networked Home Appliances", Distributed Computing Systems Workshops, 2005, 25th IEEE International Conference, Jun. 2005, pp. 514-519.

(Continued)

*Primary Examiner* — Daniel C Washburn
*Assistant Examiner* — Timothy Nguyen
(74) *Attorney, Agent, or Firm* — Dentons US LLP

(57) ABSTRACT

A terminal includes a microphone, a display, an audio output module, a communication unit to exchange data with a server or a home appliance, and a controller to control display of a screen including information related to the home appliance and to control output of information corresponding to user voice based on the information related to the home appliance on the screen via the display or the audio output module when the user voice is received via the microphone. Therefore, it is possible to improve user convenience upon utilizing the home appliance.

15 Claims, 38 Drawing Sheets

(56) References Cited

U.S. PATENT DOCUMENTS

| | | | | |
|---|---|---|---|---|
| 2013/0080289 A1* | 3/2013 | Roy | ............ | G06Q 10/10 |
| | | | | 705/26.8 |
| 2013/0104251 A1* | 4/2013 | Moore | ............ | G06F 21/602 |
| | | | | 726/30 |
| 2013/0253910 A1* | 9/2013 | Turner | ............ | G06F 17/274 |
| | | | | 704/9 |
| 2013/0274937 A1* | 10/2013 | Ahn | ............ | H02J 3/14 |
| | | | | 700/291 |
| 2014/0167931 A1* | 6/2014 | Lee | ............ | H04L 12/2818 |
| | | | | 340/12.5 |
| 2015/0149120 A1* | 5/2015 | Burkhardt | ............ | A47J 36/32 |
| | | | | 702/189 |
| 2015/0356971 A1* | 12/2015 | Stolcke | ............ | H04N 7/183 |
| | | | | 704/231 |
| 2016/0057816 A1* | 2/2016 | Alias | ............ | H05B 6/6438 |
| | | | | 219/679 |

OTHER PUBLICATIONS

Cohen et al., "Voice-Activated Kitchen Assistant", IP.Com Journal, West Henrietta, NY, Jun. 1, 1995, pp. 617-618.

\* cited by examiner

TERMINAL AND HOME APPLIANCE SYSTEM INCLUDING THE SAME

CROSS-REFERENCE TO RELATED APPLICATION

This application claims the priority benefit of Korean Patent Application No. 10-2015-0035007, filed on, 13 Mar. 2015, in the Korean Intellectual Property Office, the disclosure of which is incorporated herein by reference.

BACKGROUND

1. Field of the Disclosure

The present disclosure relates to a terminal and a home appliance system including the same, and, more particularly, to a terminal capable of improving user convenience upon utilizing a home appliance, and a home appliance including the same.

2. Background

Among home appliances, a refrigerator stores food, a washing machine washes laundry, an air conditioner adjusts indoor temperature, and a cooker cooks food.

As various communication methods are developed, a variety of research in hopes of increasing user convenience in terms of communication with a home appliance has been conducted.

SUMMARY

Therefore, the present disclosure has been made in view of the above problems, and it is an object of the present disclosure to provide a terminal capable of improving user convenience upon utilizing a home appliance, and a home appliance including the same.

In accordance with one aspect, the above and other objects can be accomplished by the provision of a terminal including a microphone, a display, an audio output module, a communication unit to exchange data with a server or a home appliance, and a controller to control display of a screen including information related to the home appliance and to control output of information corresponding to user voice based on the information related to the home appliance on the screen via the display or the audio output module when the user voice is received via the microphone.

In accordance with another aspect, there is provided a home appliance system including a home appliance, a terminal to display a screen including information related to a home appliance and to output information corresponding to user voice based on information related to the home appliance on the screen via a display or an audio output module or to transmit the information corresponding to the user voice to the home appliance when the user voice is received via a microphone, and the home appliance to perform operation based on the information received from the terminal.

BRIEF DESCRIPTION OF THE DRAWINGS

The above and other objects, features and other advantages will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

The terms "module" and "unit" used in description of components are used herein to aid in the understanding of the components and thus should not be misconstrued as having specific meanings or roles. Accordingly, the terms "module" and "unit" may be used interchangeably. Also, the terms "module" and "unit" can refer to electrical and/or mechanical structures, or an electrical processor executing one or more instructions.

Figure 1:
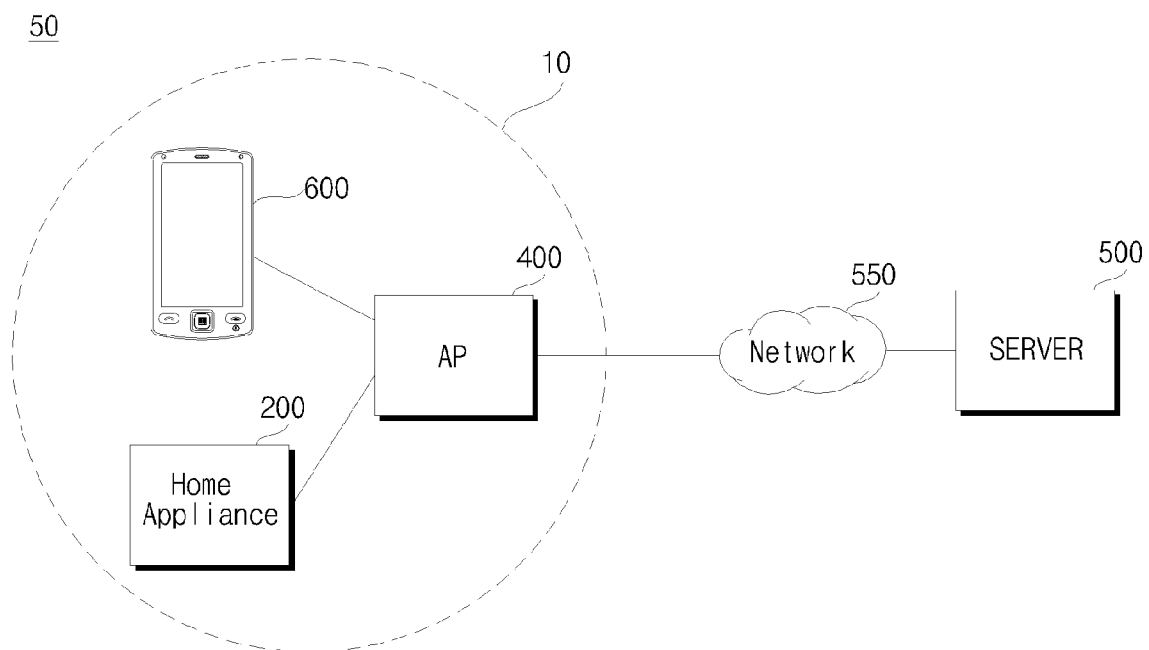
FIG. 1 is a diagram showing an example of the configuration of a home appliance system according to an embodiment of the present invention.

FIG. 1 is a diagram showing an example of a home appliance system according to an embodiment of the present invention.

Referring to the figure, a communication system 50 according to the embodiment of the present invention may include a home appliance 200, an access point (AP) apparatus 400, a server 500, a network 550 and a terminal 600.

The terminal 600 may be a mobile terminal such as a mobile phone, a smartphone, a tablet PC or a wearable apparatus or a fixed terminal such as a PC terminal, input terminal, or a TV. Hereinafter, a mobile terminal such as a smartphone will be focused upon.

The home appliance 200 is an electric device for a user and includes a refrigerator (200a of FIG. 2A), a washing machine (200b of FIG. 2B), an air conditioner (200c of FIG. 2C), a cooker (200d of FIG. 2D), a cleaner (200e of FIG. 2E), a drier, an air cleaner, a temperature control device and an energy storage device, etc., for example.

The home appliance 200 includes a communication unit (not shown) and may exchange data with electric devices in an internal network 10 or electric devices connectable over an external network 550. For data exchange, the communication unit (not shown) may exchange data with the AP apparatus 400 by wire or wirelessly.

The AP apparatus 400 may provide the internal network 10 and, more particularly, a wireless network to adjacent electric devices.

The AP apparatus 400 may allocate radio channels according to a predetermined communication method to the electric devices in the internal network 10 and perform wireless data communication via the channels. Here, the predetermined communication method may be Wi-Fi communication.

At this time, the mobile terminal 600 located in the internal network 10 is connected to the home appliance 200 via the AP apparatus 400, thereby performing monitoring and remote control of the home appliance 200.

The AP apparatus 400 may perform data communication with an external electric device via the external network 550 in addition to the internal network 10.

For example, the AP apparatus 400 may perform wireless data communication with the externally located mobile terminal 600 via the external network 550.

At this time, the mobile terminal 600 located in the external network 550 is connected to the home appliance 200 via the external network 550 and the AP apparatus 400, thereby performing monitoring, remote control, etc., of the home appliance.

As another example, the AP apparatus 400 may perform wireless data communication with the externally located server 500 via the external network 550.

The server 500 may be a web server. Therefore, data related to a web page screen related to the home appliance may be provided to the mobile terminal 600.

The server 500 may include a voice recognition algorithm. Upon receiving voice data, the received voice data may be converted into text data and the text data may be outputted.

The server 500 may store firmware information and operation information (course information) of the home appliance 200 and register product information of the home appliance 200. For example, the server 500 may be operated by a manufacturer. In another example, the server 500 may be operated by a public application store operator.

Figure 5:
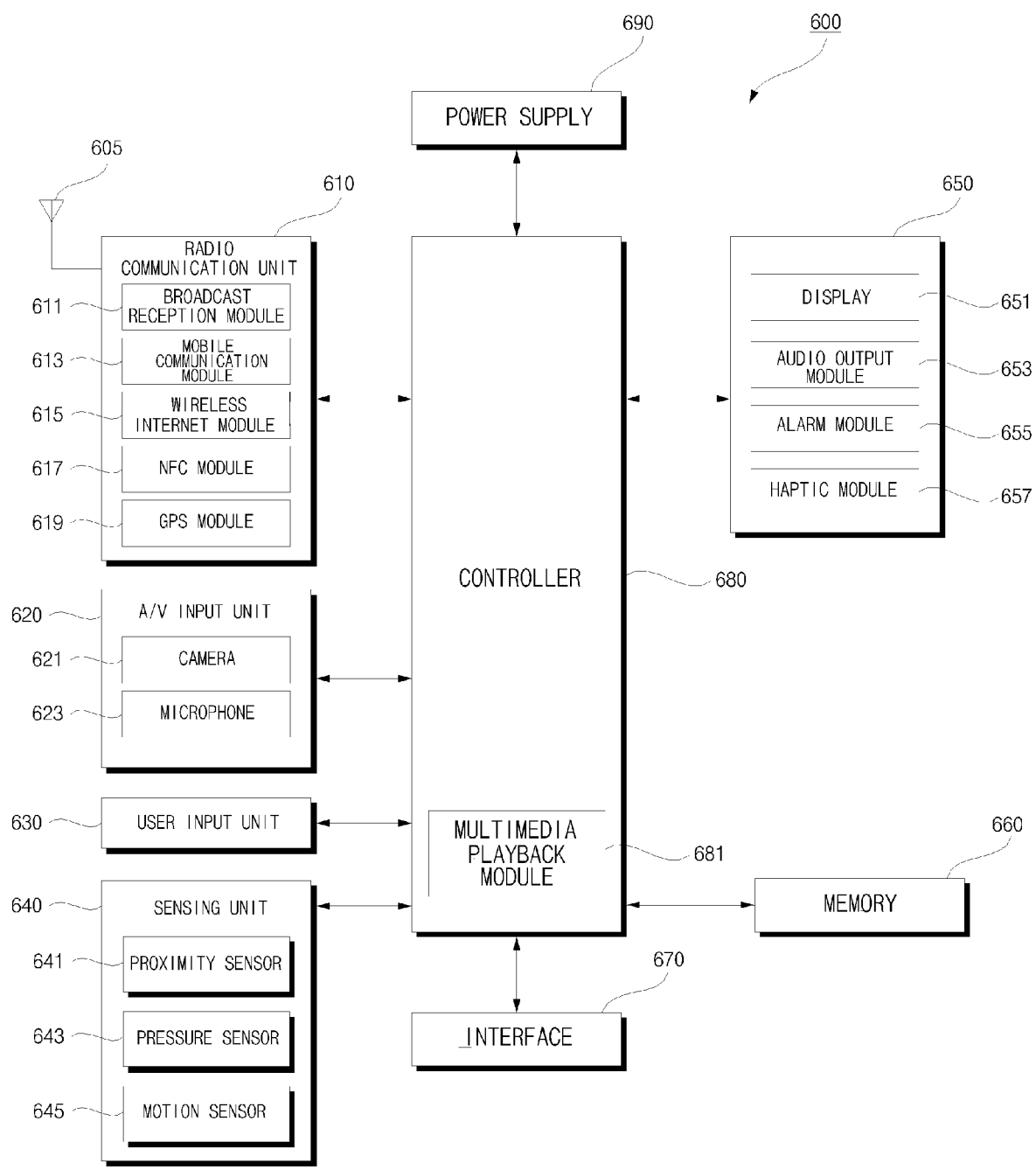
FIG. 5 is a block diagram showing an example of an internal structure of a mobile terminal of FIG. 1.

The mobile terminal 600 according to an embodiment of the present invention (as shown in FIG. 5) may display a screen including information related to the home appliance 200 and output information corresponding to user voice on the screen via the display 651 or the audio output module 653 when user voice is received via the microphone 623. Therefore, the user can conveniently and immediately acquire desired information. Accordingly, it is possible to improve user convenience.

As an example, information is extracted and outputted according to a user voice command related to an interactive natural language, such that a user conveniently acquires information without touching a terminal. Accordingly, it is possible to increase user convenience.

For example, during cooking, a user issues a voice command and listens to information corresponding to the command via the audio output module. Accordingly, it is possible to increase user convenience.

The mobile terminal 600 may transmit the extracted information to the home appliance 200 via the radio communication unit 610.

The mobile terminal 600 may analyze text included in the web page screen or the application screen including images and text and extract information corresponding to user voice from the text included in the web page screen or the application screen.

For example, the mobile terminal 600 may display a web page screen or application screen related to cooking methods using the cooker as the home appliance 200, extract information related to a predetermined material from text included in the web page screen or application screen when sound related to the predetermined material of the cooking methods is received via the microphone 623, and output the extracted information related to the predetermined material.

As another example, the mobile terminal 600 may display a web page screen or application screen related to cooking methods using the cooker as the home appliance 200, extract information related to a cooking time or cooking pattern from the text included in the web page screen or application screen when sound related to the cooking time or cooking pattern of the cooker of the cooking methods is received via the microphone 623, and output the extracted information related to the cooking time or cooking pattern.

As another example, the mobile terminal 600 may display a web page screen or application screen related to purchase of the home appliance 200, extract information related to a price from the text included in the web page screen or application screen when sound related to the price of the home appliance 200 is received via the microphone 623, and output the extracted information related to the price.

In another example, the mobile terminal 600 may display a web page screen or application screen related to the operation method of the home appliance 200, extract information related to an operation pattern or operation time from the text included in the web page screen or application screen when sound related to the operation pattern or operation time of the home appliance 200 is received via the microphone 623, and output the extracted information related to the operation pattern or operation time.

The home appliance 200 may wirelessly receive information from the mobile terminal 600, set an operation mode in correspondence with the information received from the mobile terminal 600 and operate according to the set operation mode.

The mobile terminal 600 of FIG. 1 may be a terminal which may be attached to or detached from the home appliance 200.

For example, the terminal 600 displays a screen including information related to the home appliance 200 in a state of being detached from the home appliance 200 and outputs information corresponding to user voice on the screen via the display 651 or the audio output module 653 when user voice is received via the microphone 623.

Figure 3:
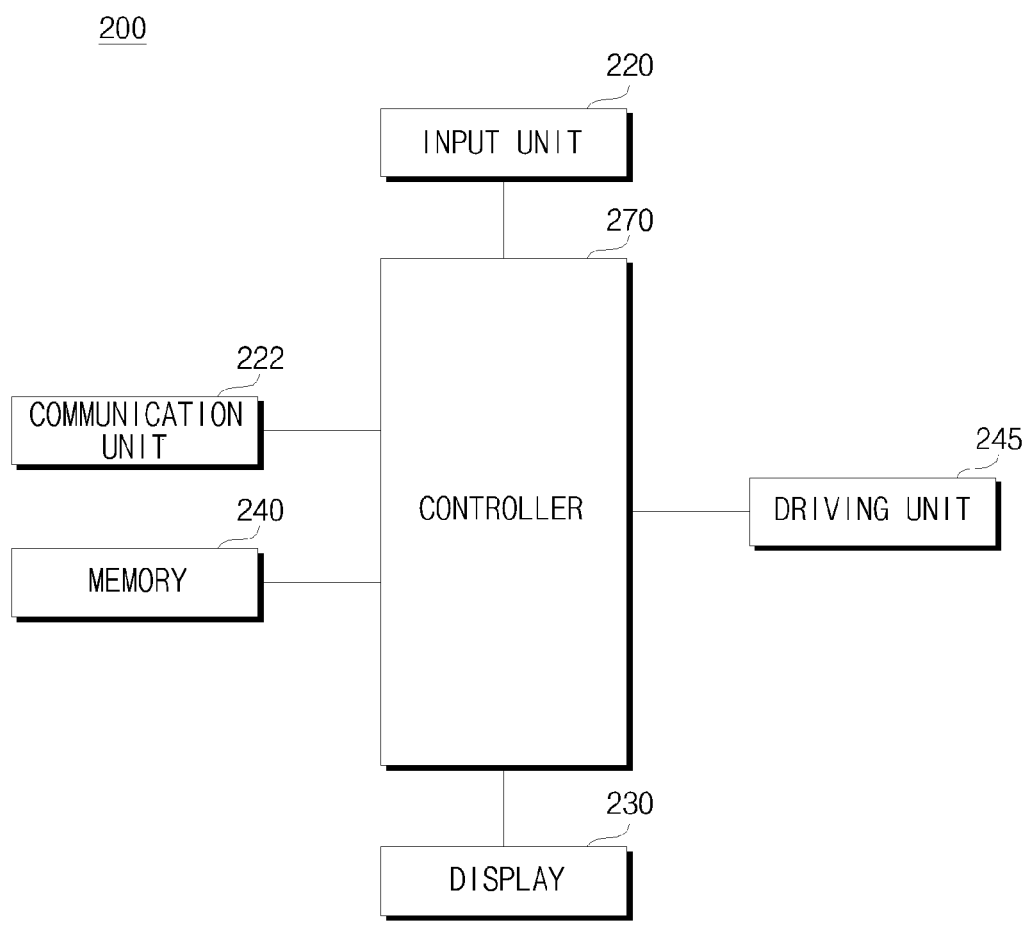
FIG. 3 is a block diagram showing an example of an internal structure of a home appliance of FIG. 1.

After the information corresponding to user voice on the screen is outputted, when the terminal 600 is mounted on the home appliance 200, the terminal 600 may control transmission of the information corresponding to user voice on the screen to the controller 270 (see FIG. 3) of the home appliance 200 via wired communication.

The controller 270 of the home appliance 200 may control automatic operation based on the information corresponding to user voice from the attached terminal 600. Therefore, it is possible to automatically operate the home appliance immediately after conveniently acquiring desired information.

This will be described in greater detail below with reference to FIG. 6 and subsequent figures thereof.

Figure 2A:
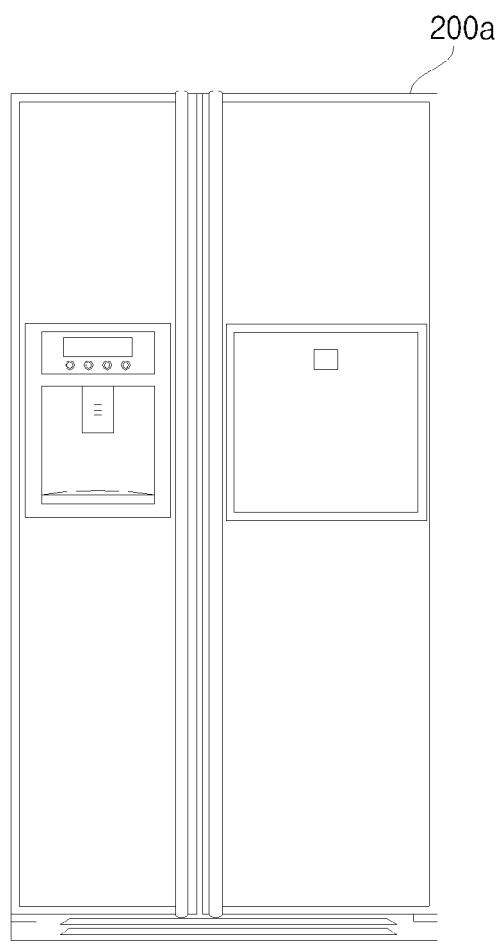
FIGS. 2A to 2E are diagrams illustrating various examples of a home appliance.
Figure 2B:
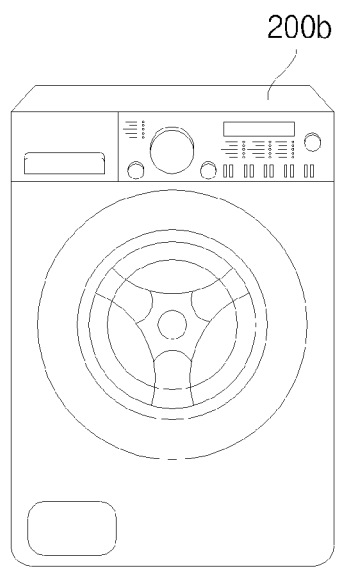
Figure 2C:
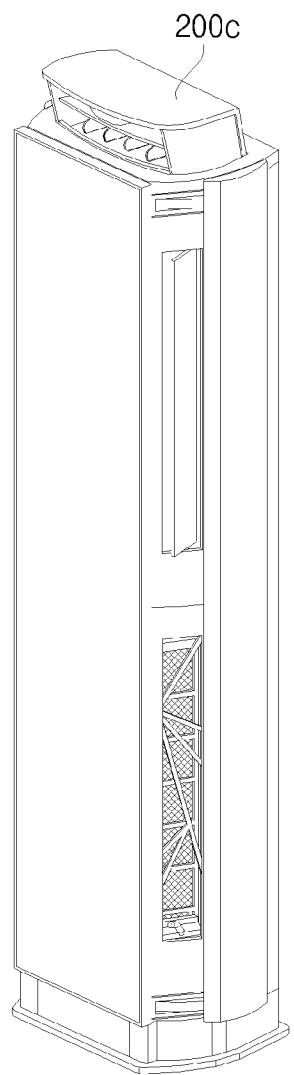
Figure 2D:
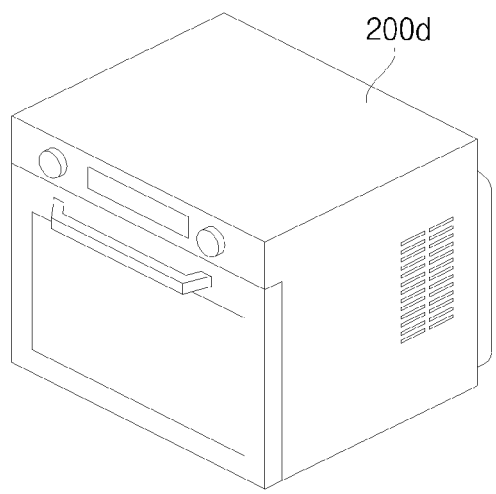
Figure 2E:
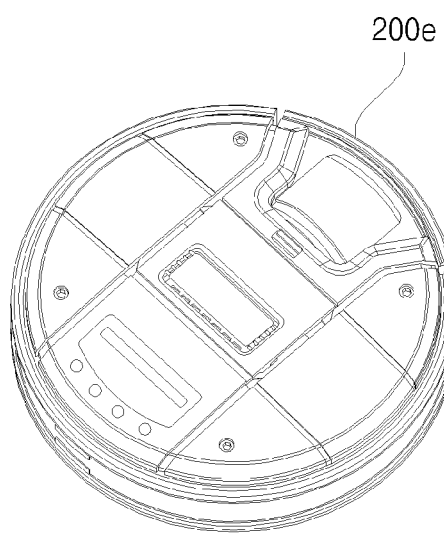

FIG. 2A shows a refrigerator 200*a*, FIG. 2B shows a washing machine 200*b*, FIG. 2C shows an air conditioner 200*c*, FIG. 2D shows a cooker 200*d*, and FIG. 2E shows a robot cleaner 200*e*.

FIG. 3A is a block diagram showing an example of an internal structure of the home appliance of FIG. 1.

Referring to the figure, the home appliance 200 may include an input unit 220 for user input, a display 230 for displaying an operation state of the home appliance, a communication unit 222 for performing communication with another external device, a driving unit 245 for driving the home appliance and a controller 270 for controlling internal units.

For example, if the home appliance is a refrigerator, the driving unit 245 may include a refrigerating compartment driving unit for driving a refrigerating compartment fan for supplying cooled air to a refrigerating compartment, a freezer compartment driving unit for driving a freezer compartment fan for supplying cooled air to a freezer compartment, and a compressor driving unit for driving a compressor for compressing a refrigerant.

In another example, if the home appliance is a washing machine, the driving unit 245 may include a driving unit for driving a drum or a tub.

In another example, if the home appliance is an air conditioner, the driving unit 245 may include a compressor driving unit for driving a compressor in an outdoor unit, an outdoor fan driving unit for driving a fan of the outdoor unit for heat exchange, and an indoor fan driving unit for driving a fan of an indoor unit for heat exchange.

In another example, if the home appliance is a cooker, the driving unit 245 may include a microwave driving unit for outputting microwaves into a cavity.

In another example, if the home appliance is a cleaner, the driving unit 245 may include a fan motor driving unit for air suction.

The communication unit 222 may include a near field communication (NFC) module 217 capable of performing NFC.

In addition, a memory 240 for storing data in the home appliance may be further included.

Figure 4:
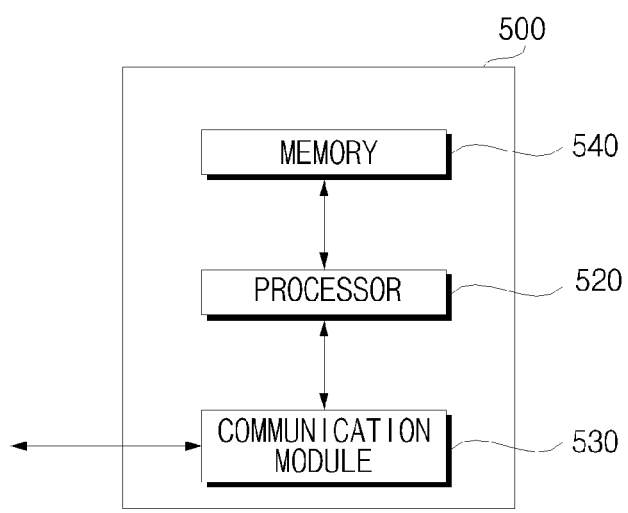
FIG. 4 is a block diagram showing an example of an internal structure of a server of FIG. 1.

FIG. 4 is a block diagram showing an example of an internal structure of the server of FIG. 1.

Referring to the figure, the server 500 may include a communication module 530, a memory 540 and a processor 520.

The communication module 530 may receive home appliance related information, for example, home appliance product information from the mobile terminal 600. The communication module 530 may transmit product information registration result information of the received home appliance product information to the mobile terminal 600.

The communication module 530 may include an Internet module or a mobile communication module.

The memory 540 may store the received home appliance product information and may include the received product information for product registration of the home appliance.

The processor 520 may perform overall control of the server 500.

The processor 520 may control generation of the product registration result information of the home appliance when receiving the product information of the home appliance from the mobile terminal 600. The processor may control transmission of the generated product registration result information to the mobile terminal 600.

In another example, if the home appliance related information is power consumption information of the home appliance, the processor 520 may control transmission of power information, such as power price information, on peak time power information, off peak time power information, real-time power information, etc., stored in the memory 540, to the mobile terminal 600.

The server 500 may be managed by a manufacturer of the home appliance 200 or an operator of an application store related to the home appliance 200.

FIG. 5 is a block diagram showing an example of an internal structure of a mobile terminal of FIG. 1.

Referring to FIG. 5, the mobile terminal 600 may include a radio communication unit 610, an audio/video (A/V) input unit 620, a user input unit 630, a sensing unit 640, an output unit 650, a memory 660, an interface 670, a controller 680 and a power supply 690.

The radio communication unit 610 according to the embodiment of the present invention may exchange data with a power management unit in a server 500 via a network 550 through a network router. For example, if the mobile terminal 600 is in a power monitoring mode for an internal power grid, the radio communication unit 610 may transmit a power monitoring request and thus receive monitoring information. In another example, if the mobile terminal 600 is in a remote control mode for an internal power grid, the radio communication unit 610 may transmit a remote control signal and receive remote control result information.

The radio communication unit 610 may include a broadcast reception module 611, a mobile communication module 613, a wireless Internet module 615, a near field communication (NFC) module 617, a global positioning system (GPS) module 619, etc.

The broadcast reception module 611 may receive at least one of a broadcast signal and broadcast-related information from an external broadcast management server through a broadcast channel. The broadcast channel may include a satellite channel and a terrestrial channel.

The broadcast signal and/or the broadcast-related information received through the broadcast reception module 611 may be stored in the memory 660.

The mobile communication module 613 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 615 is an internal or external module for wireless Internet access which may be provided to the mobile terminal 600. For example, the wireless Internet module 615 may perform Wi-Fi based wireless communication or Wi-Fi Direct based wireless communication.

The NFC module 617 may perform NFC. The NFC module 617 may receive data from the electronic device or transmit data to the electronic device, if an NFC tag or an NFC module is brought within a predetermined distance of the electronic device, that is, upon tagging.

As short-range wireless communication technology, Bluetooth, Radio-Frequency IDentification (RFID), Infrared Data Association (IrDA), Ultra WideBand (UWB), and ZigBee may be used.

The GPS module 619 may receive position information from a plurality of GPS satellites.

The A/V input unit 620 receives an audio signal or a video signal and may include a camera 621 and a microphone 623.

The user input unit 630 includes key input data enabling the user to control the operation of the mobile terminal. The user input unit 630 may include a keypad, a dome switch, a touchpad (static pressure/static electrical), etc. In particular, if the touchpad and the display 351 have a layered structure, this may be called a touchscreen.

The sensing unit 640 detects a current state of the mobile terminal 600 such as whether the mobile terminal 600 is opened or closed, the position of the mobile terminal 600 and contact/non-contact of a user and generates a sensing signal for controlling the operation of the mobile terminal 600.

The sensing unit 640 may include a proximity sensor 641, a pressure sensor 643 and a motion sensor 645. The motion sensor 645 may sense motion or position of the mobile terminal 600 using an acceleration sensor, a gyroscopic sensor and a gravity sensor. In particular, the gyroscopic sensor measures an angular speed and senses a direction (angle) in which the mobile terminal rotates from a reference direction.

The output unit 650 may include a display 651, an audio output module 653, an alarm unit 655 and a haptic module 657.

The display 651 displays information processed by the mobile terminal 600.

As described above, if the display 651 and the touchpad have the layered structure to configure the touchscreen, the display 651 can be used not only as an output device but also as an input device for inputting information via user touch.

The audio output module 653 may output audio data received from the radio communication unit 610 or stored in the memory 660. The audio output module 653 may include a speaker, a buzzer, etc.

The alarm unit 655 outputs a signal notifying the user that an event has occurred in the mobile terminal 600. For example, the alarm unit 655 may output a signal in the form of vibrations.

The haptic module 657 generates a variety of tactile effects that the user can feel. A typical example of the tactile effect generated by the haptic module 657 is vibration.

The memory 660 may store a program for processing and control of the controller 680 and may temporarily store input or output data (for example, a phonebook, messages, still images, and moving images).

The interface 670 serves as an interface with all external devices connected to the mobile terminal 600. The interface 670 may receive data from an external device or receive power and transmit power to the components of the mobile terminal 600 or transmit data of the mobile terminal 600 to an external device.

The controller 680 controls the overall operation of the mobile terminal 600. For example, the controller 680 performs control and processing associated with voice communication, data communication, video communication, and the like. The controller 680 may include a multimedia playback module 681 for multimedia playback. The multimedia playback module 681 may be implemented in the controller 680 in hardware form or may be implemented in software form executed by the controller 680.

In association with the embodiment of the present invention, the controller 680 may control display of a screen including information related to the home appliance 200 and control output of information corresponding to user voice on the screen via the display 651 or the audio output module 653 when user voice is received via the microphone 623.

The controller 680 may control extraction of information corresponding to user voice on the screen when user voice is received via the microphone 623 in a state of displaying a screen including information related to the home appliance 200, and output of the extracted information via the display 651 or the audio output module 653.

The controller 680 may control reception of information related to the home appliance 200 from the server 500 and display of a screen including the information related to the home appliance 200.

The controller 680 may control accessing of a web page related to the home appliance 200, display of a web page screen, and output of information corresponding to user voice on the web page screen via the display 651 or the audio output module 653 when user voice is received via the microphone 623.

The controller 680 may control execution of an application related to the home appliance 200 according to input for executing the application related to the home appliance 200, display of the application screen related to the home appliance 200, and output of information corresponding to user voice on the application screen when user voice is received via the microphone 623.

The controller 680 may control transmission of the extracted information to the home appliance 200 via the radio communication unit 610.

The controller 680 may control display of a web page screen or application screen related to cooking methods using a cooker as the home appliance 200, extraction of information related to a material from text included in the web page screen or application screen when sound related to the material of the cooking methods is received via the microphone 623, and output of the extracted information related to the material.

The controller 680 may analyze text included in the screen and extract information corresponding to user voice from the text included in the screen.

The controller 680 may control display of the web page screen or application screen related to cooking methods using the cooker as the home appliance 200, extraction of information related to a cooking time or cooking pattern from text included in the web page screen or application screen when sound related to the cooking time or cooking pattern of the cooking methods is received via the microphone 623, and output of the extracted information related to the cooking time or cooking pattern.

The controller 680 may control display of a web page screen or application screen related to purchase of the home appliance 200, extraction of information related to a price from text included in the web page screen or application screen when sound related to the price of the home appliance 200 is received via the microphone 623, and output of the extracted information related to the price.

The power supply 690 receives external power or internal power (such as a battery) and supplies power required for operation to each component under control of the controller 680.

The block diagram of the mobile terminal 600 shown in FIG. 5 is only exemplary. Depending upon the specifications of the mobile terminal 600 in actual implementation, the components of the mobile terminal 600 may be combined or omitted or new components may be added. For example, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Figure 6:
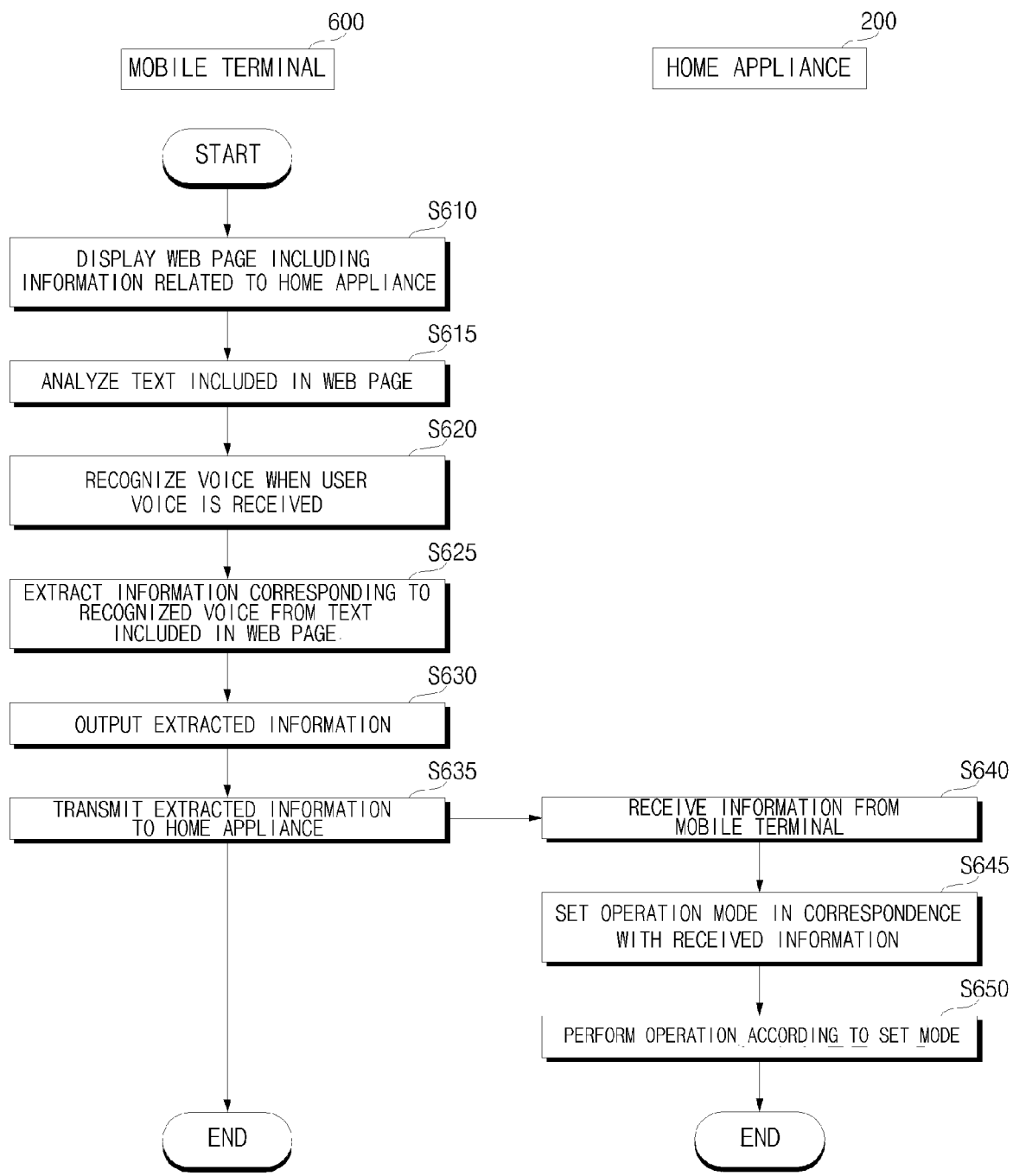
FIG. 6 is a flowchart illustrating an example of a method for operating a mobile terminal of FIG. 1.

FIG. 6 is a flowchart illustrating an example of a method for operating a mobile terminal of FIG. 1, and FIGS. 7A to 12F are views referred to for describing the operating method of FIG. 6.

First, the controller 680 of the mobile terminal 600 may control display of a web page screen or application screen including information related to the home appliance 200 according to user input.

For example, the controller 680 of the mobile terminal 600 may control display of the web page screen or application screen related to cooking methods using a cooker 200*d* when the home appliance 200 is the cooker 200*d*.

As another example, the controller 680 of the mobile terminal 600 may control display of the web page screen or application screen related to purchase of the home appliance 200.

As another example, the controller 680 of the mobile terminal 600 may control display of the web page screen or application screen related to the operation method of the home appliance 200.

Next, the controller 680 of the mobile terminal 600 may analyze text included in the web page screen or the application screen (S615).

The controller 680 of the mobile terminal 600 may extract only text and analyze the text included in the web page screen or the application screen, when the web page screen or the application screen includes images and text.

For example, the controller 680 of the mobile terminal 600 may extract the text included in the currently displayed web page screen or application screen using a text recognition algorithm. Then, the extracted text may be analyzed.

In another example, the controller 680 of the mobile terminal 600 may request transmission of text data related to the web page screen or the application screen from the server 500 and receive the text data from the server 500. Then, the extracted text may be analyzed.

The controller 680 of the mobile terminal 600 performs signal processing with respect to user voice when user voice is received via the microphone 623. Then, voice is recognized based on voice signal processing (S620).

The controller 680 of the mobile terminal 600 may recognize voice using the voice recognition algorithm of the server 500 or the voice recognition algorithm of the mobile terminal 600.

For example, the controller 680 of the mobile terminal 600 may recognize voice using the voice recognition algorithm, when natural-language voice "How many spoonfuls of salt?" or "How long is a heating time?" is received.

Next, the controller 680 of the mobile terminal 600 may extract information corresponding to user voice from text included in the web page screen or application screen (S625). Then, the extracted information may be outputted (S630).

For example, the controller 680 of the mobile terminal 600 may extract information such as "Three teaspoonfuls of salt" and "Heat for 3 minutes" in response to the question "How many spoonfuls of salt?" or "How long is a heating time?".

The controller 680 of the mobile terminal 600 may control output of information such as "Three teaspoonfuls of salt" and "Heat for 3 minutes" via the display 651 or the audio output module 653.

The controller 680 of the mobile terminal 600 may extract and output information corresponding to a voice command related to an interactive natural language, such that a user conveniently acquires related information without touch operation of the mobile terminal 600. Therefore, it is possible to increase user convenience.

The controller 680 of the mobile terminal 600 may transmit the extracted information to the home appliance 200 via the communication unit 610 (S635).

Next, the communication unit 222 of the home appliance 200 may wirelessly receive information from the mobile terminal 600.

Next, the controller 270 of the home appliance 200 may set an operation mode in correspondence with the received information (S645).

Next, the controller 270 of the home appliance 200 may control operation according to the set mode.

For example, when the received information is "Heat for 3 minutes", the cooker 200d may perform operation "Heat for 3 minutes". Therefore, the user can conveniently perform desired cooking operation. Accordingly, it is possible to increase user convenience.

Figure 7A:
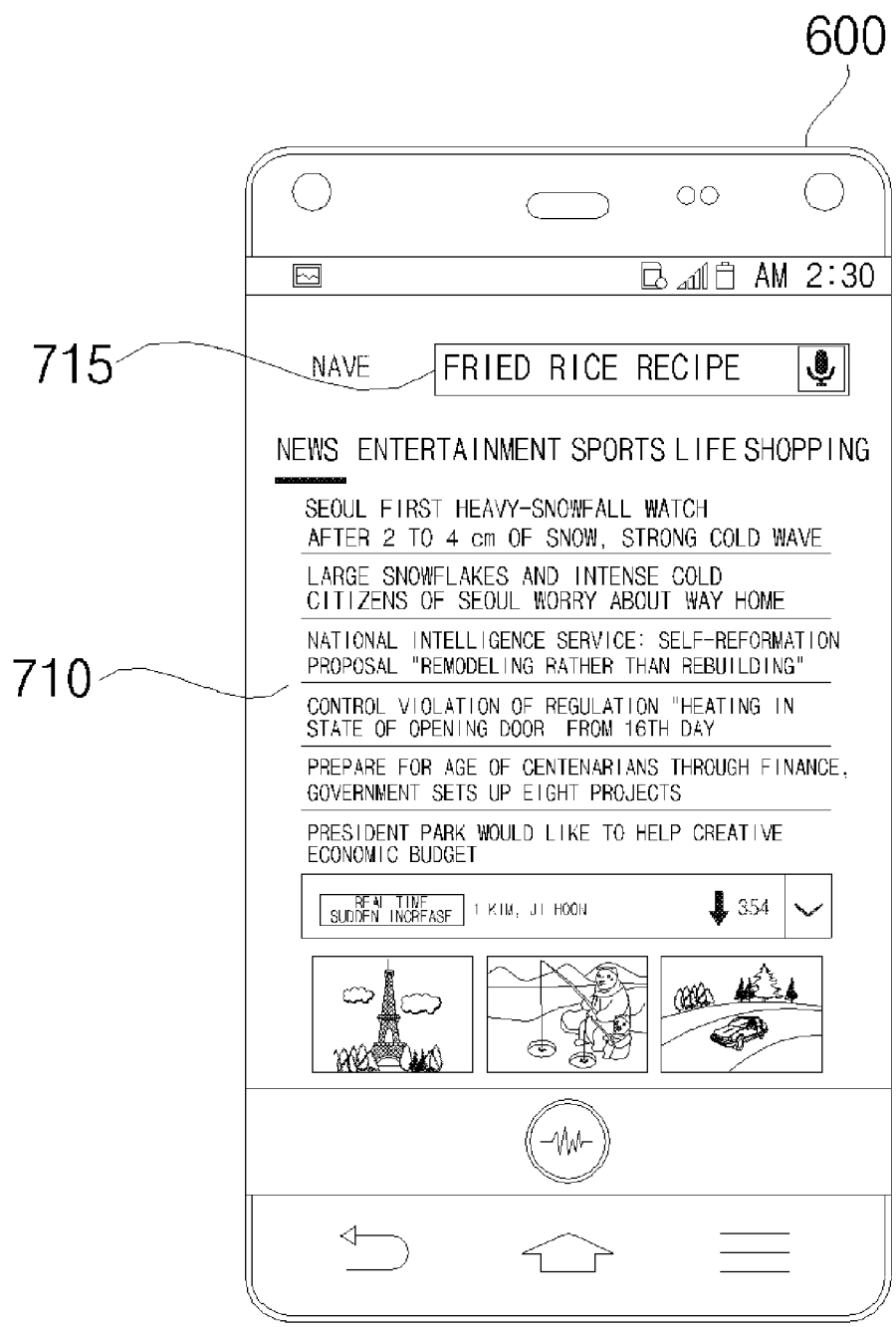
FIGS. 7A to 12F are examples of views referred to for describing the operating method of FIG. 6.

FIG. 7A shows input of a search term 715 "Fried rice recipe" in a search window of a web page screen 710 for search.

By user input, the controller 680 of the mobile terminal 600 may control execution of a web browser in the mobile terminal 600 to display the web page screen 710.

Figure 7B:
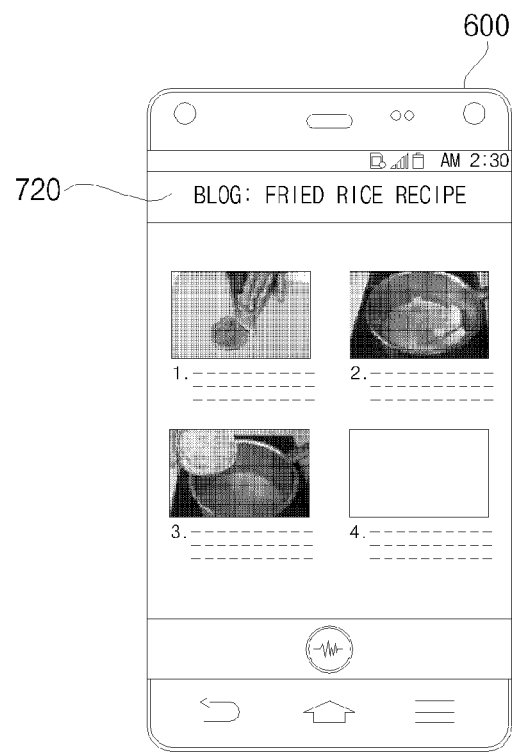

As shown in the figure, when the search term 715 "Fried rice recipe" is inputted in the search window of the web page screen 710 for search, as shown in FIG. 7B, a "Fried rice recipe related screen" 720 is searched for and displayed.

The "Fried rice recipe related screen" 720 of FIG. 7B may include images and text.

The controller 680 of the mobile terminal 600 may extract text from the "Fried rice recipe related screen" 720 and analyze the text.

Figure 7C:
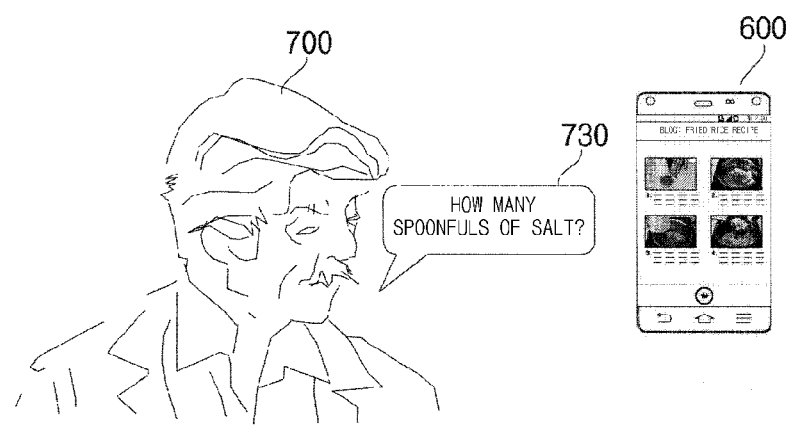

The controller 680 of the mobile terminal 600 performs signal processing with respect to user voice when voice 730 of a user 700 "How many spoonfuls of salt?" is input via the microphone 623 as shown in FIG. 7C. Then, voice is recognized based on voice signal processing.

Figure 7D:
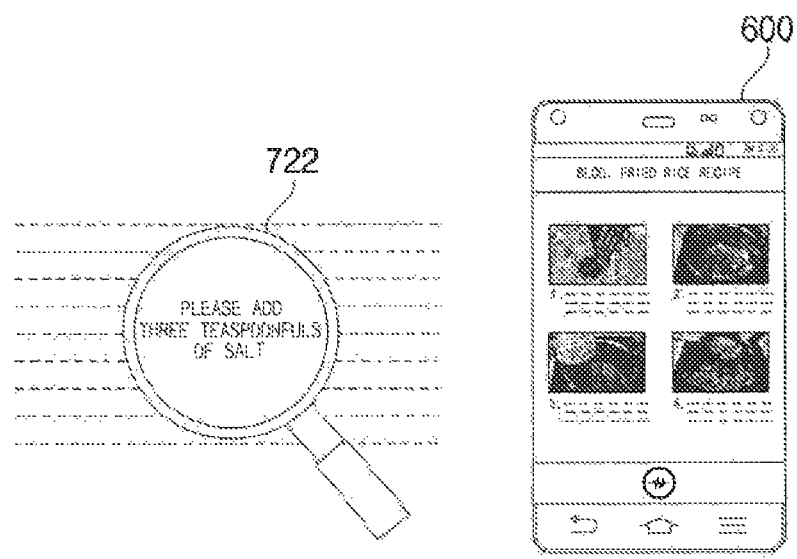

As shown in FIG. 7D, the controller 680 of the mobile terminal 600 may extract information 722 corresponding to the voice 730 of the user 700 "How many spoonfuls of salt?" from the text included in the "Fried rice recipe related screen" 720. In the figure, information "Please add three teaspoonfuls of salt" 722 is shown.

Figure 7E:
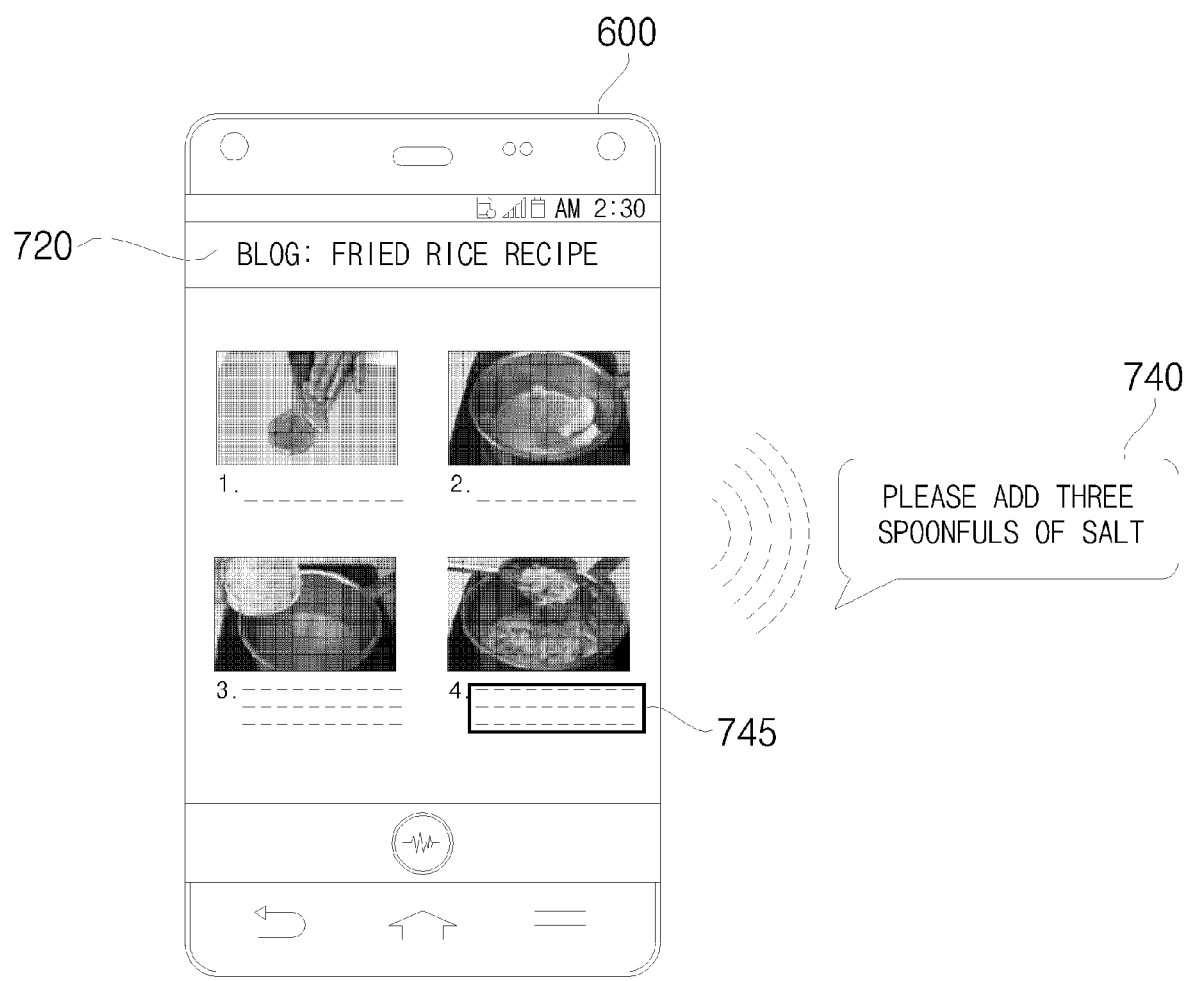

As shown in FIG. 7E, the controller 680 of the mobile terminal 600 may control output of sound 740 "Please add three teaspoonfuls of salt" via the audio output module 653.

The user may conveniently acquire related information without touch operation of the mobile terminal 600. Accordingly, it is possible to increase user convenience. In particular, during cooking, the user can issue a command via voice and listen to information corresponding to the command via the audio output module. Accordingly, it is possible to improve user convenience.

As shown in FIG. 7E, the controller 680 of the mobile terminal 600 may control highlight and display of a region 745 including information "Please add three teaspoonfuls of salt" of the "Fried rice recipe related screen" 720 displayed on the display 651.

Figure 7F:
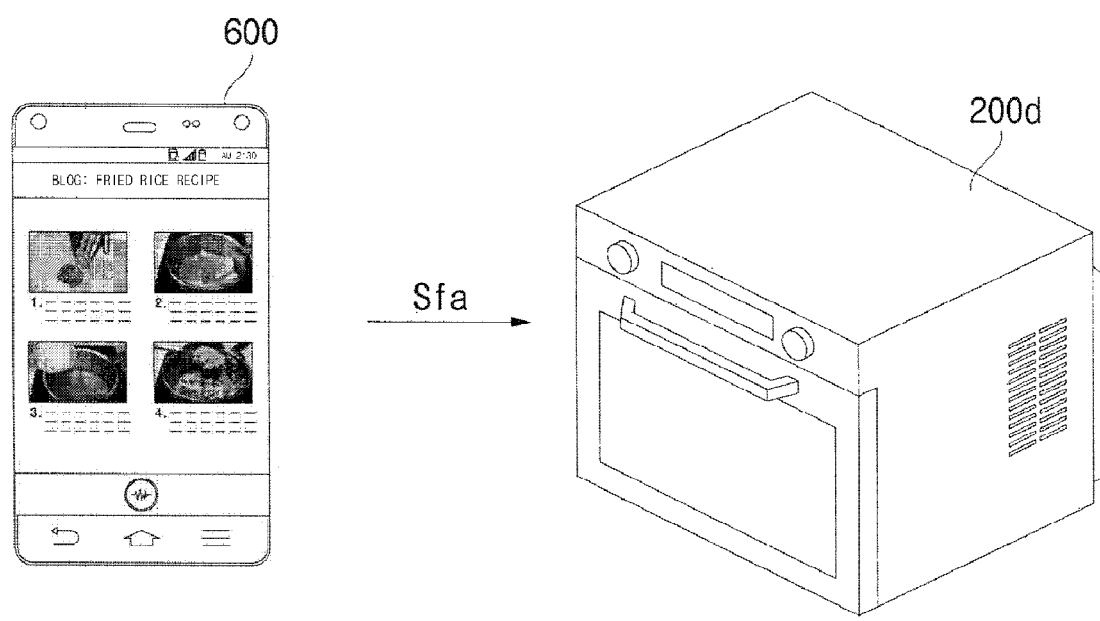

As shown in FIG. 7F, the controller 680 of the mobile terminal 600 may transmit the extracted information Sfa to the cooker 200d via the communication unit 610.

The cooker 200d may output information "Please add three teaspoonfuls of salt" again via the audio output module (not shown) before starting cooking.

Figure 8A:
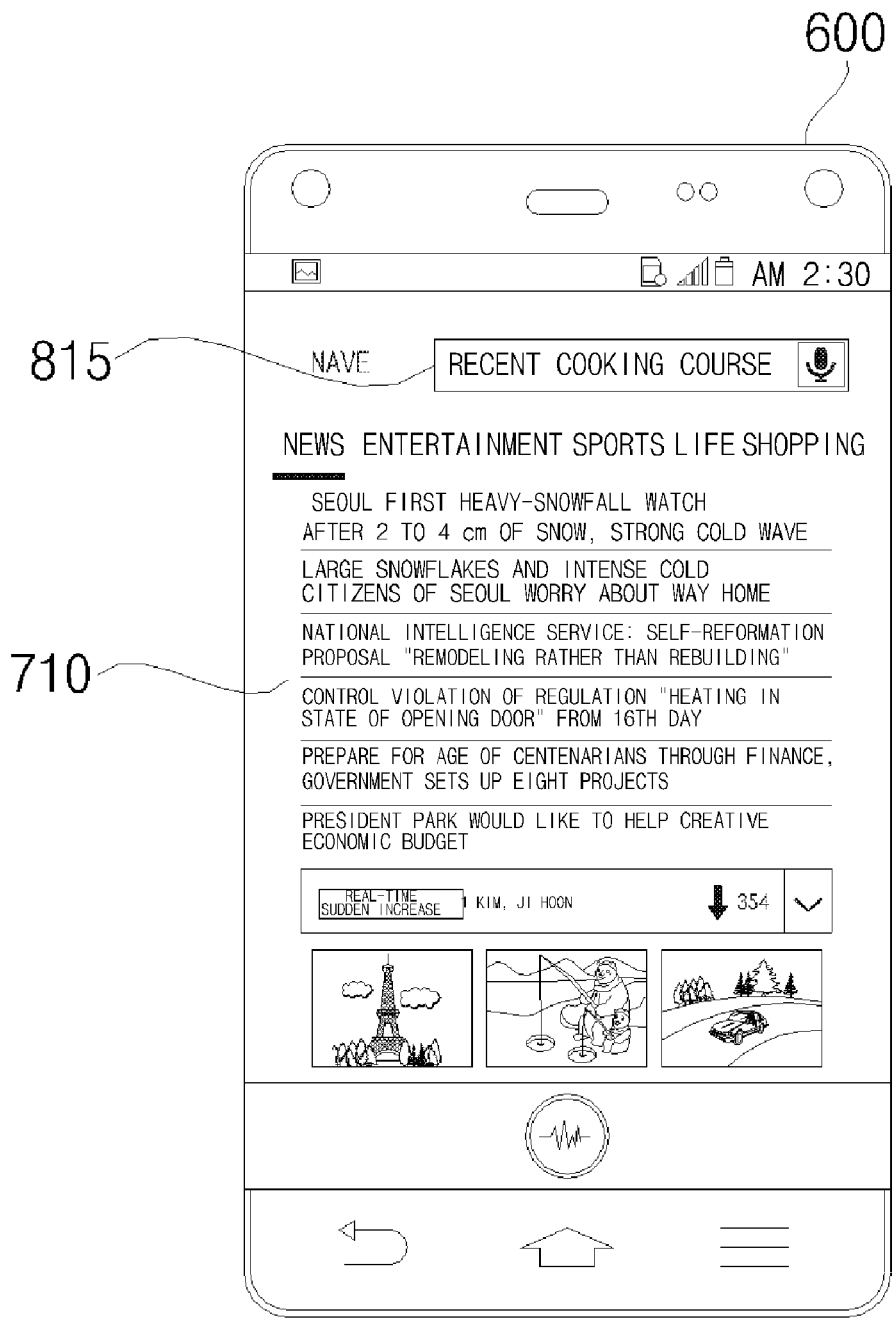

FIG. 8A shows input of a search term 815 "Recent cooking course" in a search window of a web page screen 710 for search.

Figure 8B:
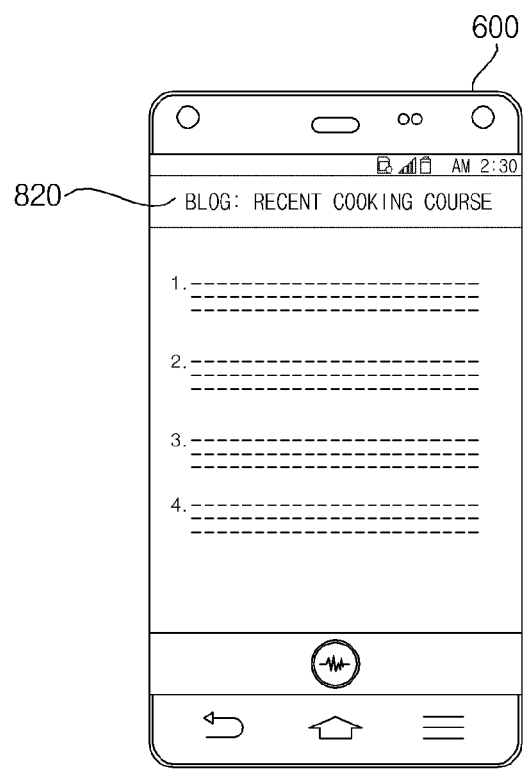

As shown in the figure, when the search term 815 "Recent cooking course" is inputted in the search window of the web page screen 710 for search, as shown in FIG. 8B, a "Recent cooking course related screen" 820 may be searched for and displayed.

The "Recent cooking course related screen" 820 of FIG. 8B may include images and text.

The controller 680 of the mobile terminal 600 may extract text from the "Recent cooking course related screen" 820 and analyze the text.

Figure 8C:
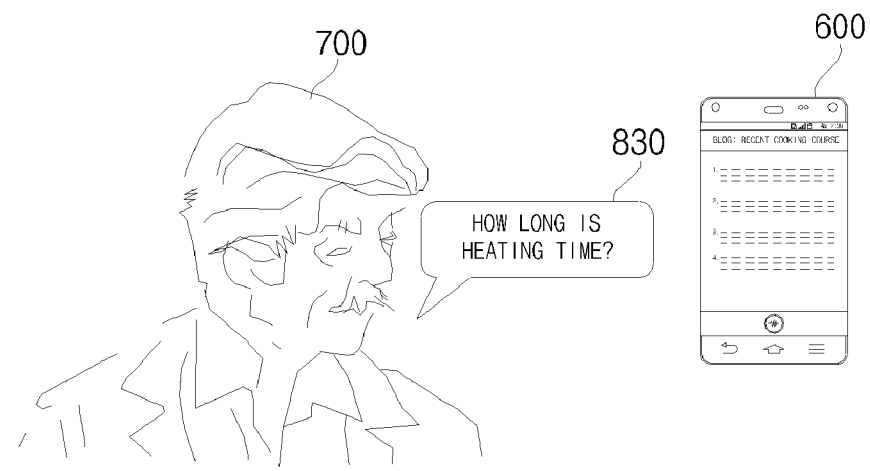

The controller 680 of the mobile terminal 600 performs signal processing with respect to user voice when voice 830 of a user 700 "How long is a heating time?" is inputted via the microphone 623 as shown in FIG. 8C. Then, voice is recognized based on voice signal processing.

Figure 8D:
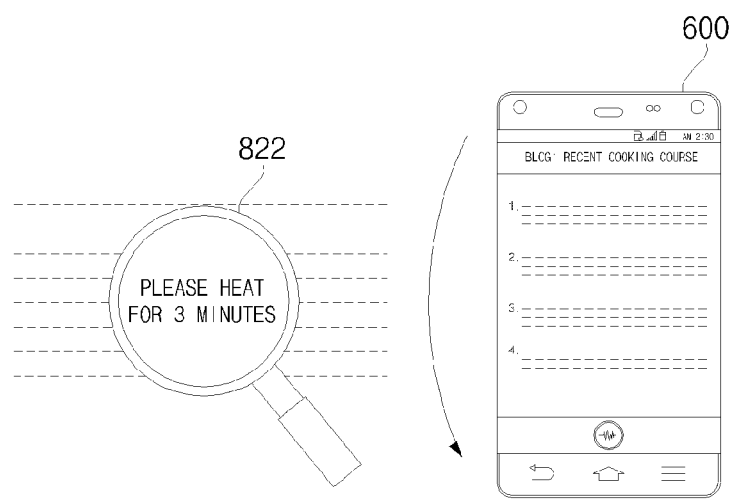

As shown in FIG. 8D, the controller 680 of the mobile terminal 600 may extract information 822 matching voice 830 of the user 700 "How long is a heating time?" from the text included in the "Recent cooking course related screen" 820. In the figure, information "Please heat for 3 minutes" 822 is shown.

Figure 8E:
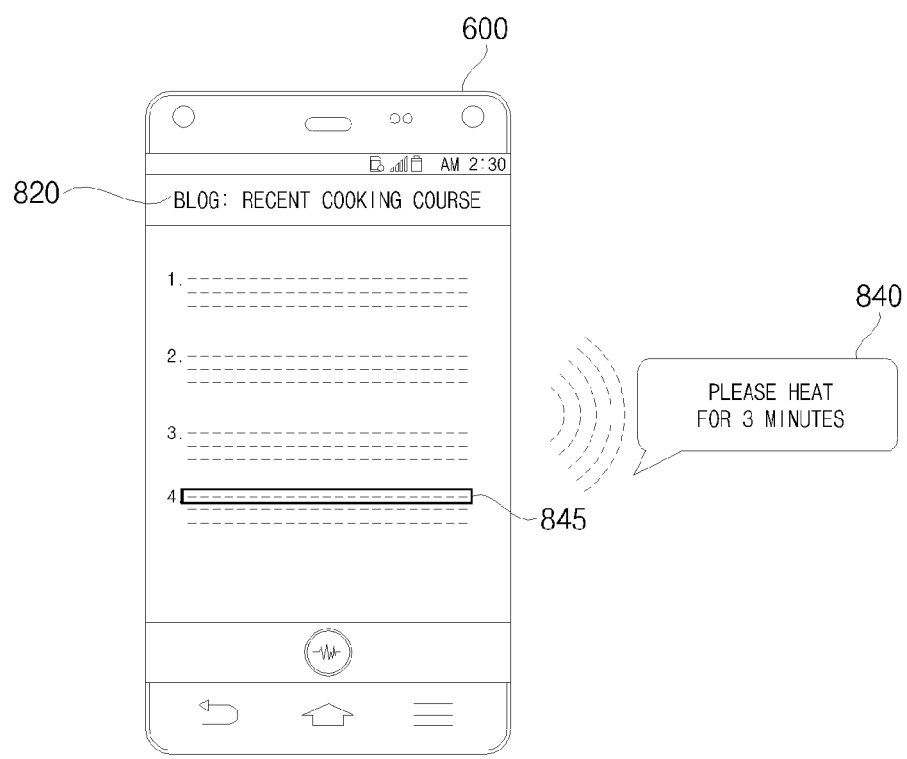

As shown in FIG. 8E, the controller 680 of the mobile terminal 600 may control output of sound 840 "Please heat for 3 minutes" via the audio output module 653.

The user may conveniently acquire related information without touch operation of the mobile terminal 600. Accordingly, it is possible to increase user convenience. In particular, during cooking, the user can issue a command via voice and listen to information corresponding to the command via the audio output module. Accordingly, it is possible to improve user convenience.

As shown in FIG. 8E, the controller 680 of the mobile terminal 600 may control highlight and display of a region 845 including information "Please heat for 3 minutes" of the "Recent cooking course related screen" 820 displayed on the display 651.

Figure 8F:
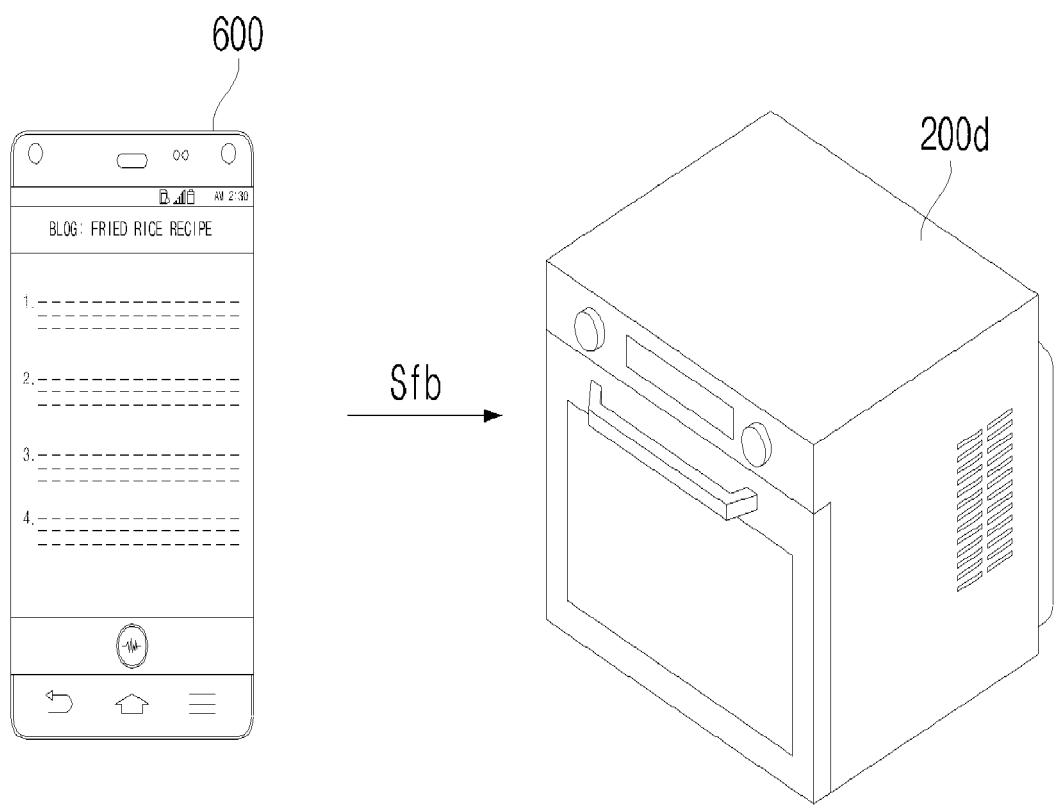

As shown in FIG. 8F, the controller 680 of the mobile terminal 600 may transmit the extracted information Sfb to the cooker 200d via the communication unit 610.

The cooker 200d may operate in a state of setting a heating mode to 3 minutes upon starting cooking.

Figure 9A:
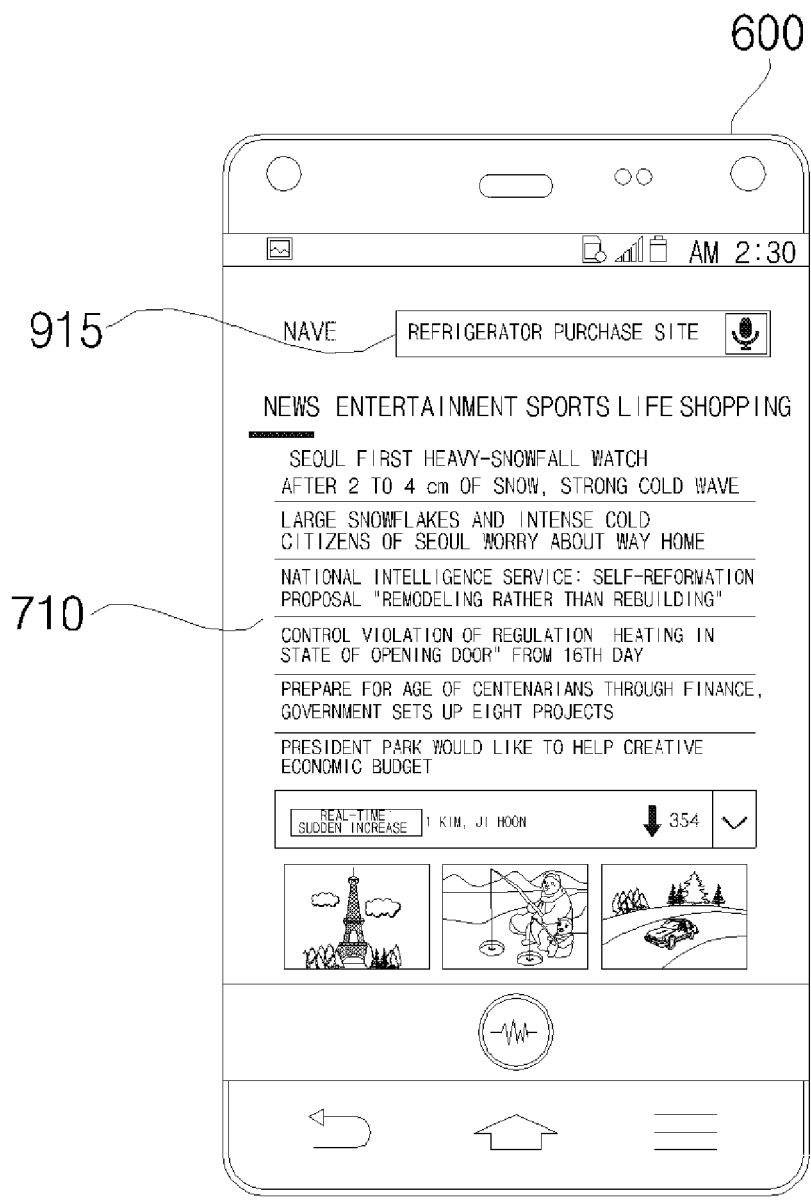

FIG. 9A shows input of a search term 915 "Refrigerator purchase site" in a search window of a web page screen 710 for search.

Figure 9B:
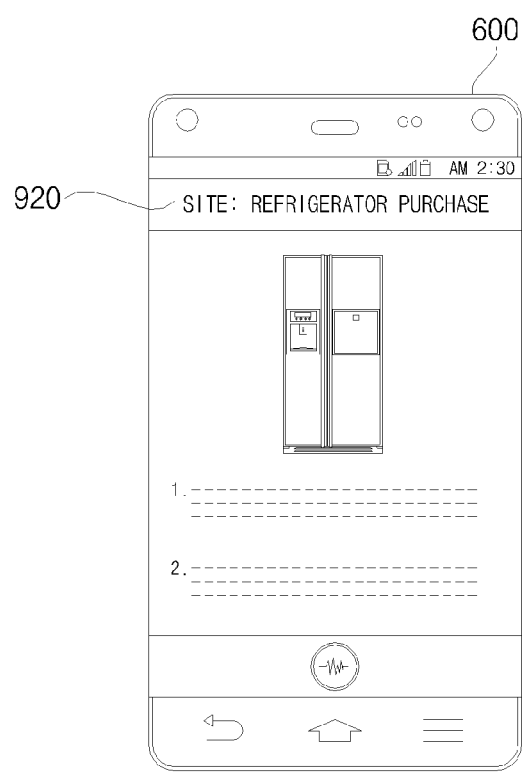

As shown in the figure, when the search term 915 "Refrigerator purchase site" is inputted in the search window of the web page screen 710 for search, as shown in FIG. 9B, a "Refrigerator purchase site related screen" 920 may be searched for and displayed.

The "Refrigerator purchase site related screen" 920 of FIG. 9B may include images and text.

The controller 680 of the mobile terminal 600 may extract text from the "Refrigerator purchase site related screen" 920 and analyze the text.

Figure 9C:

The controller 680 of the mobile terminal 600 performs signal processing with respect to user voice when voice 930 of a user 700 "How much is an 850 L refrigerator?" is inputted via the microphone 623 as shown in FIG. 9C. Then, voice is recognized based on voice signal processing.

Figure 9D:
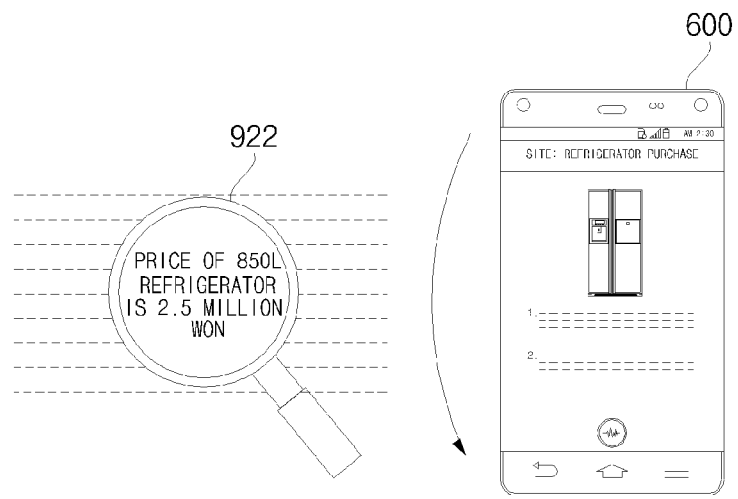

As shown in FIG. 9D, the controller 680 of the mobile terminal 600 may extract information 922 corresponding to the voice 930 of the user 700 "How much is an 850 L refrigerator?" from the text included in the "Refrigerator purchase site related screen" 920. In the figure, information "The price of the 850 L refrigerator is 2.5 million won" 922 is shown.

Figure 9E:
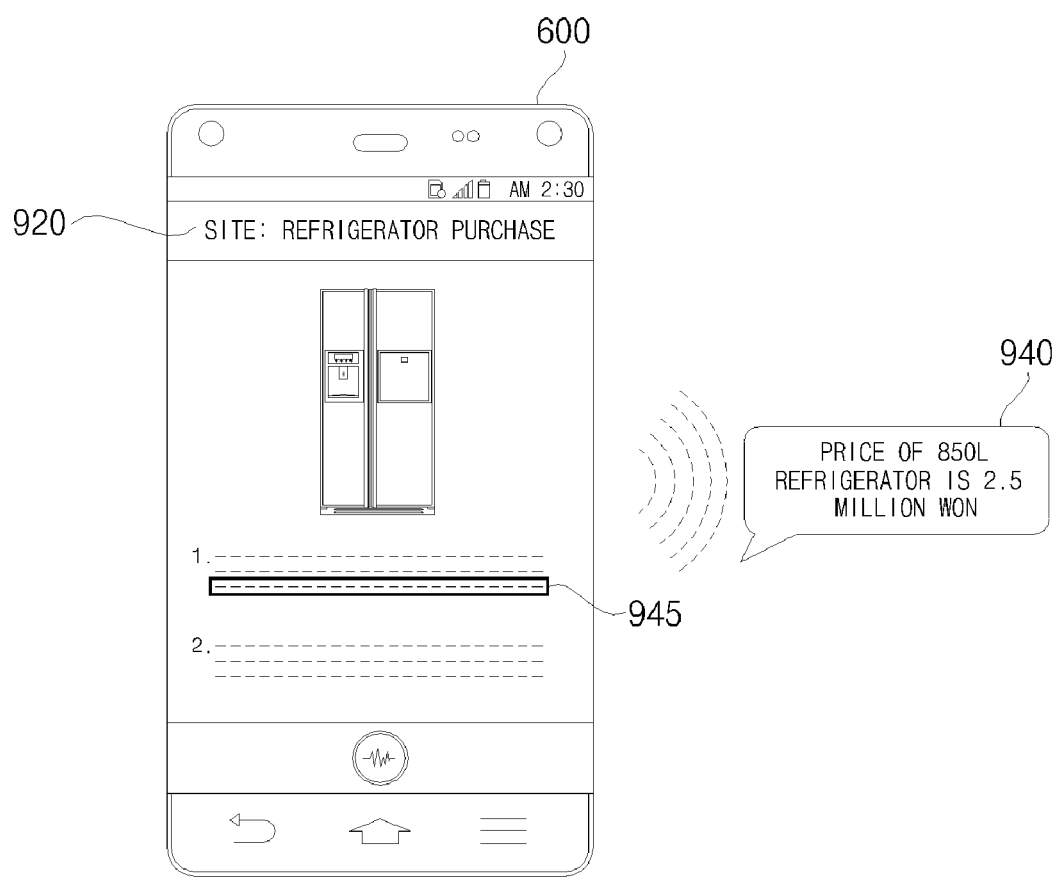

As shown in FIG. 9E, the controller 680 of the mobile terminal 600 may control output of sound 940 "The price of the 850 L refrigerator is 2.5 million won" via the audio output module 653.

The user may conveniently acquire related information without touch operation of the mobile terminal 600. Accordingly, it is possible to increase user convenience.

As shown in FIG. 9E, the controller 680 of the mobile terminal 600 may control highlight and display of a region 945 including information "The price of the 850 L refrigerator is 2.5 million won" of the "Refrigerator purchase site related screen" 920 displayed on the display 651.

Figure 10A:
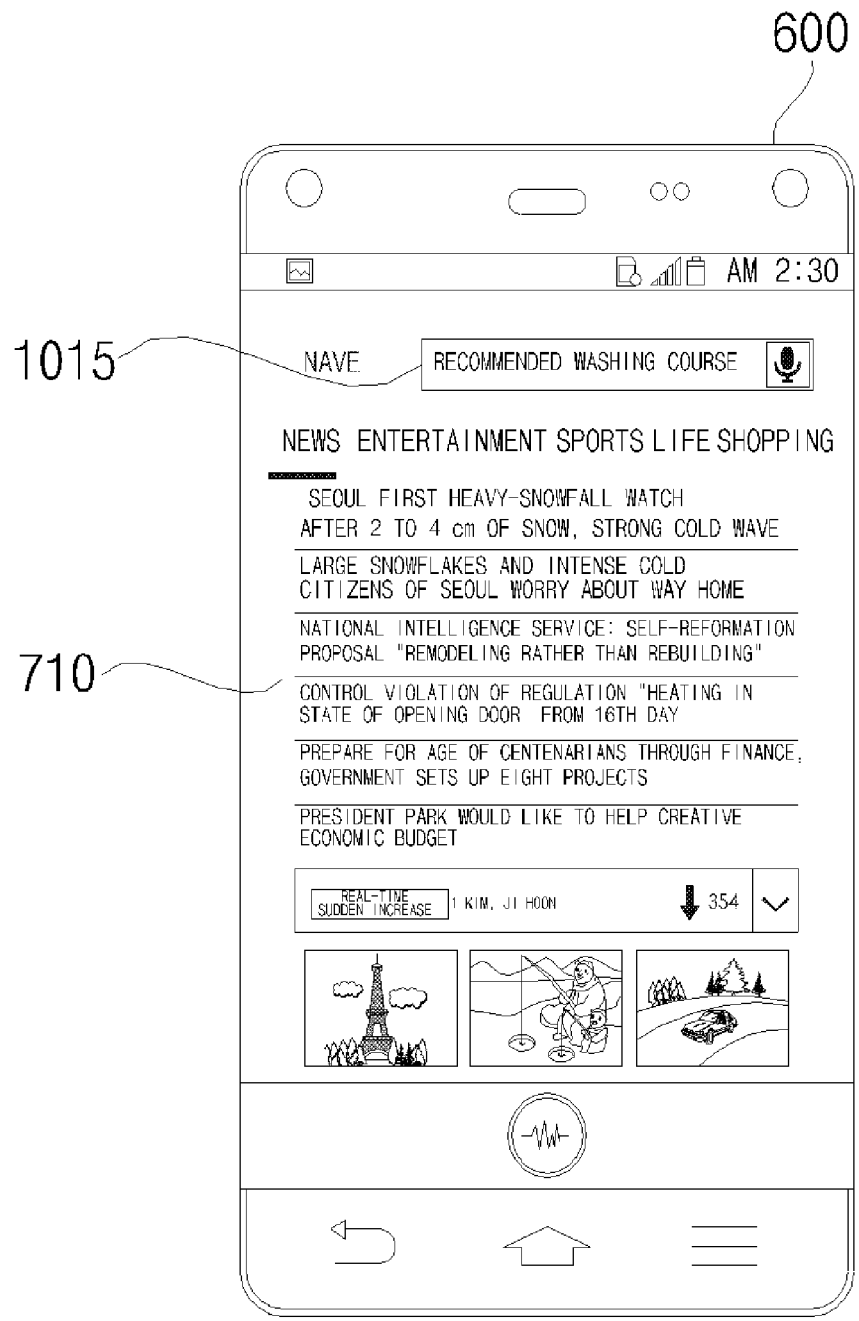

FIG. 10A shows input of a search term 1015 "Recommended washing course" in a search window of a web page screen 710 for search.

Figure 10B:
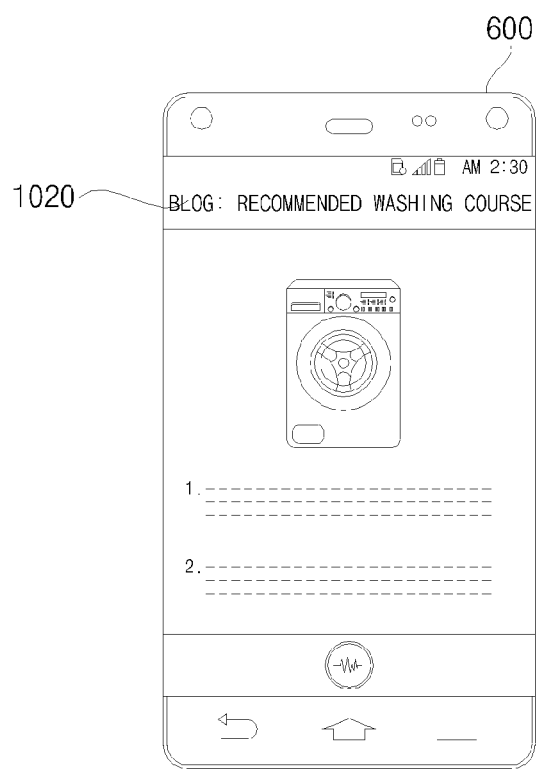

As shown in the figure, when the search term 1015 "Recommended washing course" is inputted in the search window of the web page screen 710 for search, as shown in FIG. 10B, a "Recommended washing course related screen" 1020 may be searched for and displayed.

The "Recommended washing course related screen" 1020 of FIG. 10B may include images and text.

The controller 680 of the mobile terminal 600 may extract text from the "Recent cooking course related screen" 1020 and analyze the text.

Figure 10C:

The controller 680 of the mobile terminal 600 performs signal processing with respect to user voice when voice 1030 of a user 700 "How long is a rinsing time?" is inputted via the microphone 623 as shown in FIG. 10C. Then, voice is recognized based on voice signal processing.

Figure 10D:
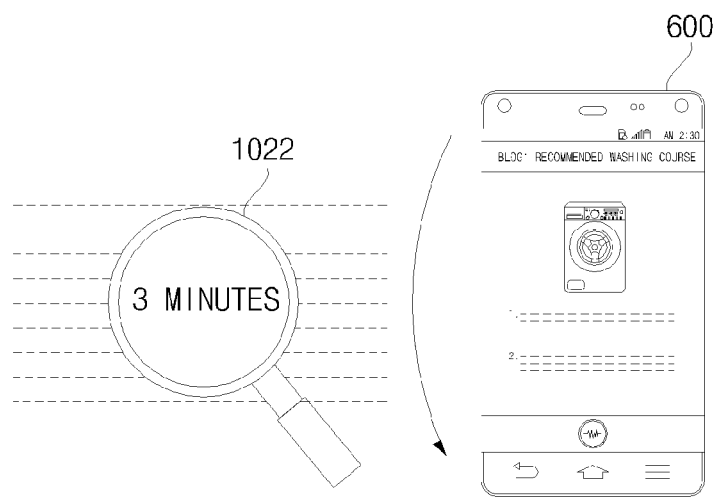

As shown in FIG. 10D, the controller 680 of the mobile terminal 600 may extract information 1022 corresponding to the voice 1030 of the user 700 "How long is a heating time?" from the text included in the "Recommended washing course related screen" 1020. In the figure, information "3 minutes" 1022 is shown.

Figure 10E:
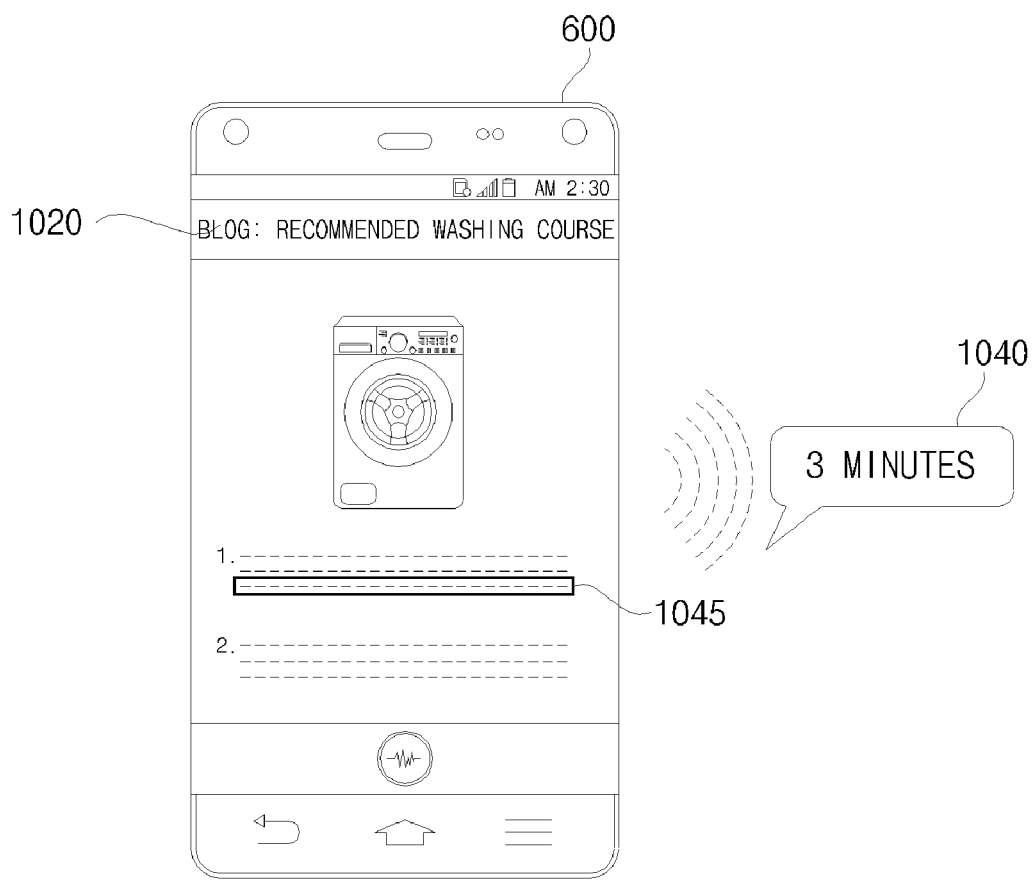

As shown in FIG. 10E, the controller 680 of the mobile terminal 600 may control output of sound 1040 "3 minutes" via the audio output module 653.

The user may conveniently acquire related information without touch operation of the mobile terminal 600. Accordingly, it is possible to increase user convenience.

As shown in FIG. 10E, the controller 680 of the mobile terminal 600 may control highlight and display of a region 1045 including information "3 minutes" of the "Recommended washing course related screen" 1020 displayed on the display 651.

Figure 10F:
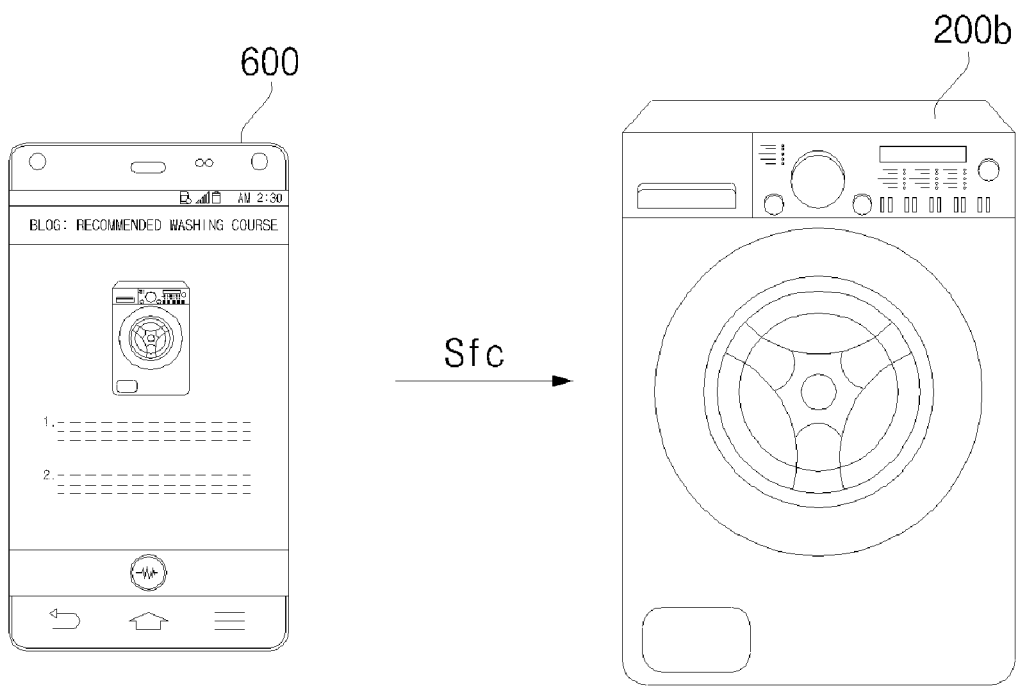

As shown in FIG. 10F, the controller 680 of the mobile terminal 600 may transmit the extracted information Sfc to the washing machine 200b via the communication unit 610.

The washing machine 200d may operate in a state of setting a rinsing mode to 3 minutes upon starting operation.

Figure 11A:
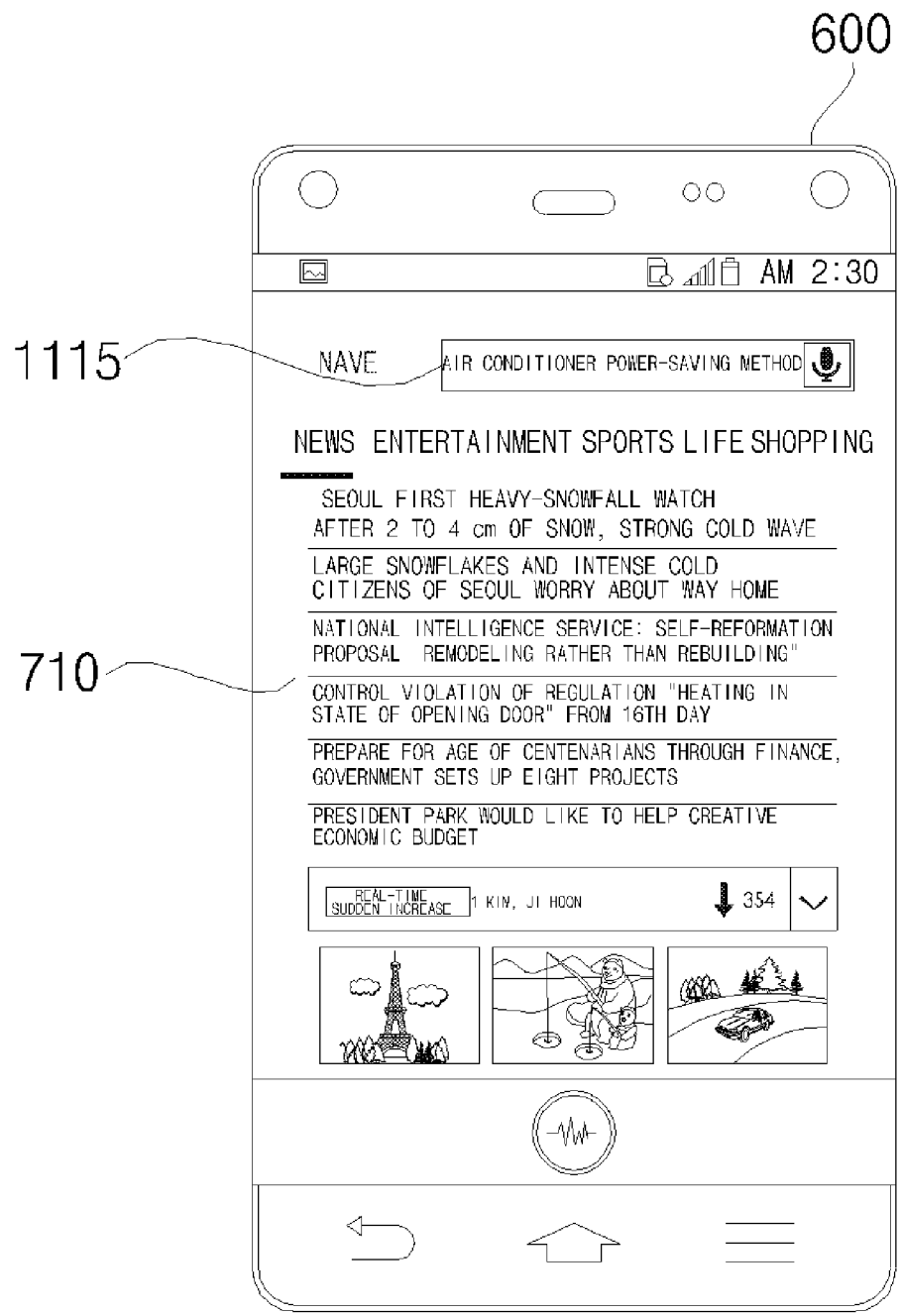

FIG. 11A shows input of a search term 1115 "Air conditioner power-saving method" in a search window of a web page screen 710 for search.

Figure 11B:
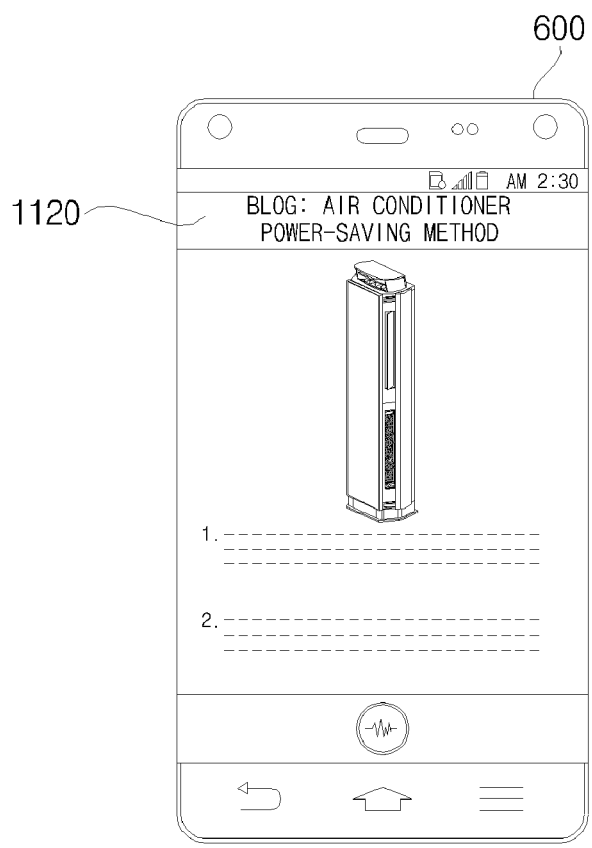

As shown in the figure, when the search term 1115 "Air conditioner power-saving method" is inputted in the search window of the web page screen 710 for search, as shown in FIG. 11B, an "Air conditioner power-saving method related screen" 1120 may be searched for and displayed.

The "Air conditioner power-saving method related screen" 1120 of FIG. 11B may include images and text.

The controller 680 of the mobile terminal 600 may extract text from the "Air conditioner power-saving method related screen" 1120 and analyze the text.

Figure 11C:
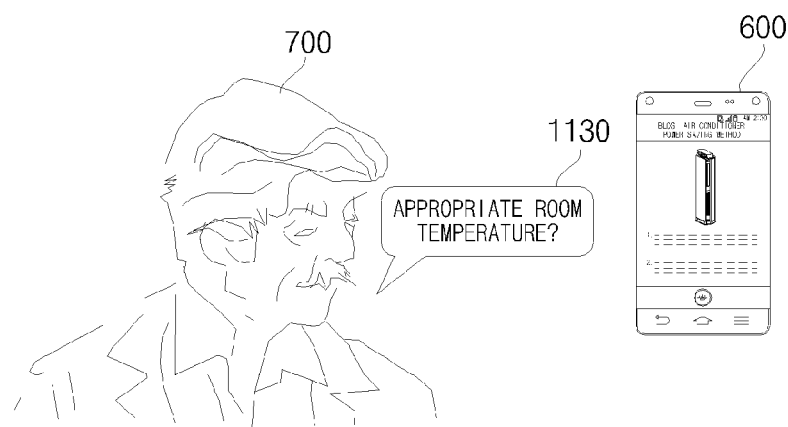

The controller 680 of the mobile terminal 600 performs signal processing with respect to user voice when voice 1030 of a user 700 "Appropriate room temperature?" is inputted via the microphone 623 as shown in FIG. 11C. Then, voice is recognized based on voice signal processing.

Figure 11D:
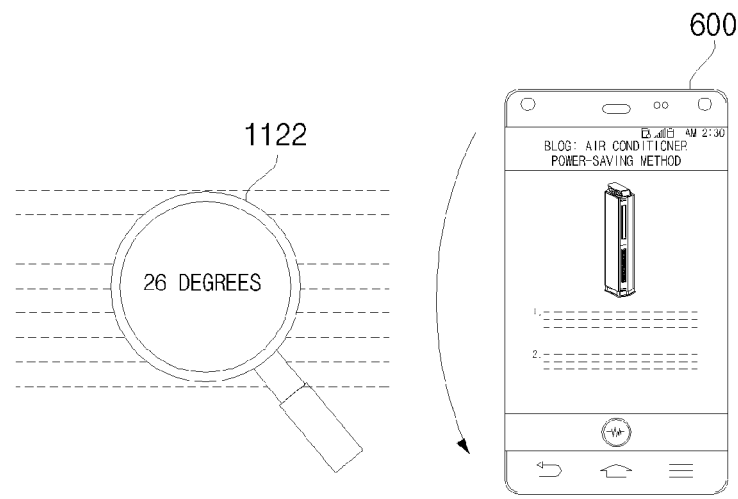

As shown in FIG. 11D, the controller 680 of the mobile terminal 600 may extract information 1122 corresponding to the voice 1130 of the user 700 "Appropriate room temperature?" from the text included in the "Air conditioner power-saving method related screen" 1120. In the figure, information "26 degrees" 1122 is shown.

Figure 11E:
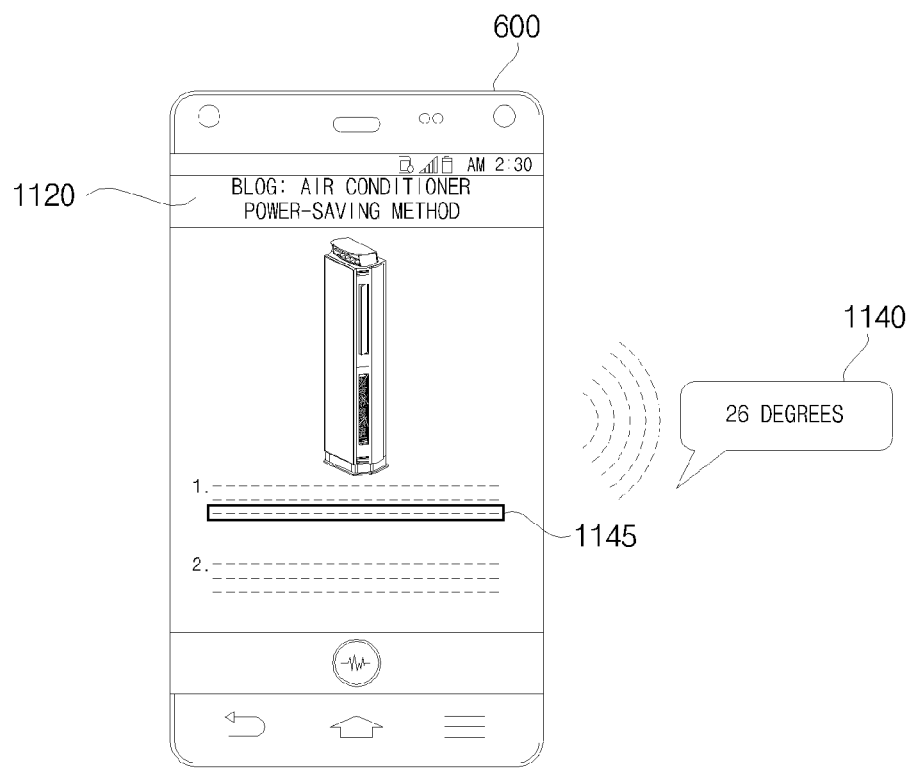

As shown in FIG. 11E, the controller 680 of the mobile terminal 600 may control output of sound 1140 "26 degrees" via the audio output module 653.

The user may conveniently acquire related information without touch operation of the mobile terminal 600. Accordingly, it is possible to increase user convenience.

As shown in FIG. 11E, the controller 680 of the mobile terminal 600 may control highlight and display of a region 1145 including information "26 degrees" of the "Air conditioner power-saving method related screen" 1120 displayed on the display 651.

Figure 11F:
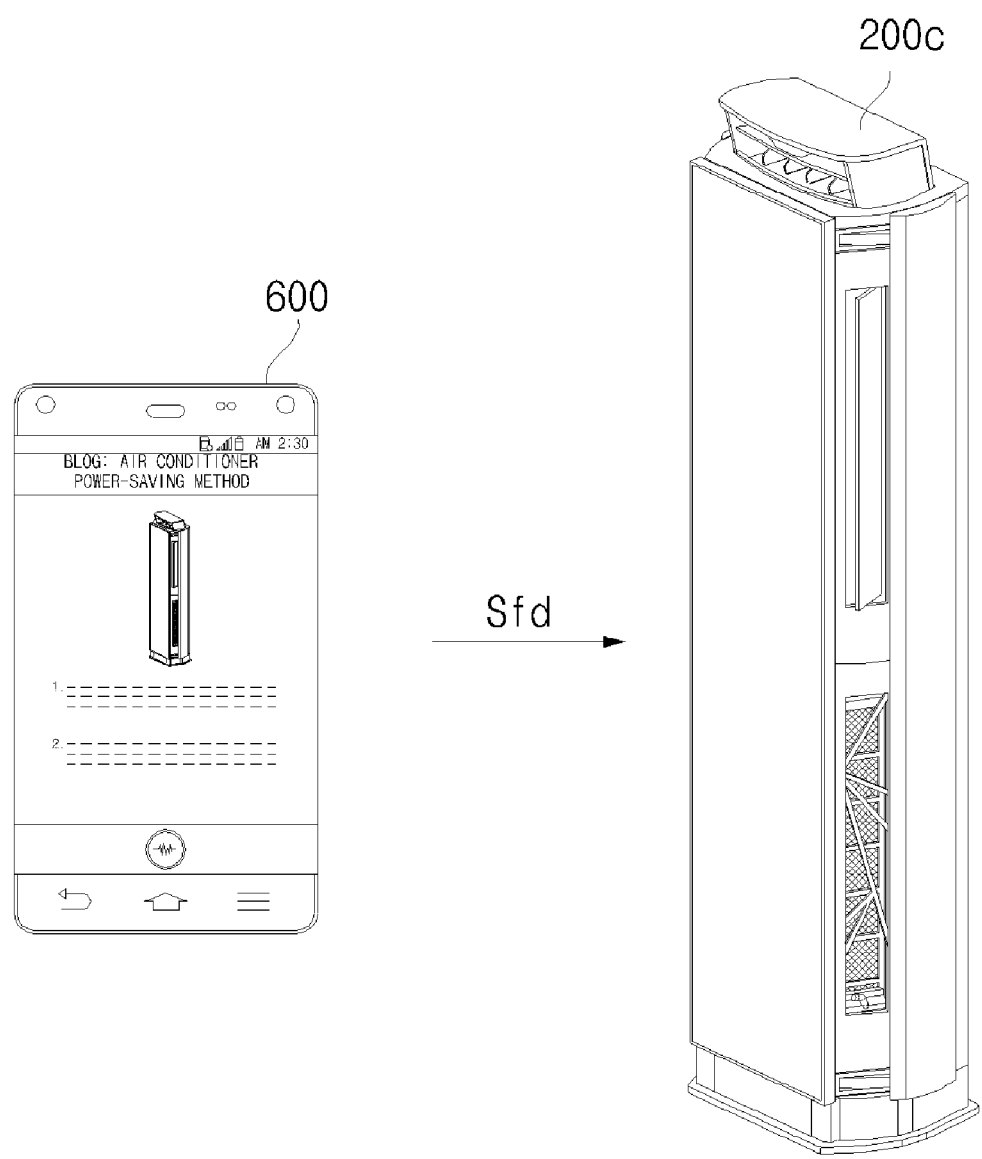

As shown in FIG. 11F, the controller 680 of the mobile terminal 600 may transmit the extracted information Sfd to the air conditioner 200c via the communication unit 610.

The air conditioner 200c may operate in a state of setting a target temperature to 26 degrees upon starting operation.

Figure 12A:
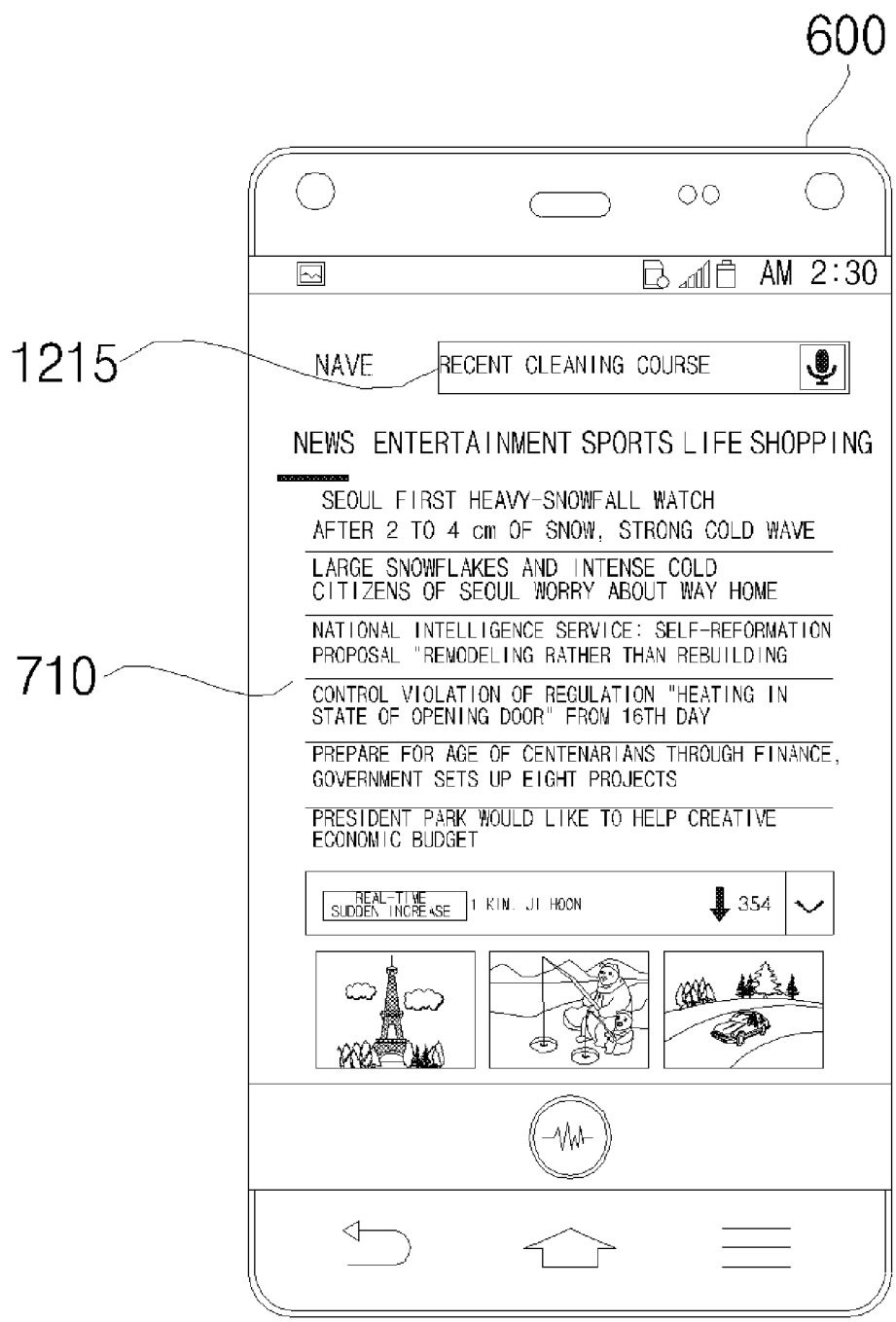

FIG. 12a shows input of a search term 1215 "Recent cleaning course" in a search window of a web page screen 710 for search.

Figure 12B:
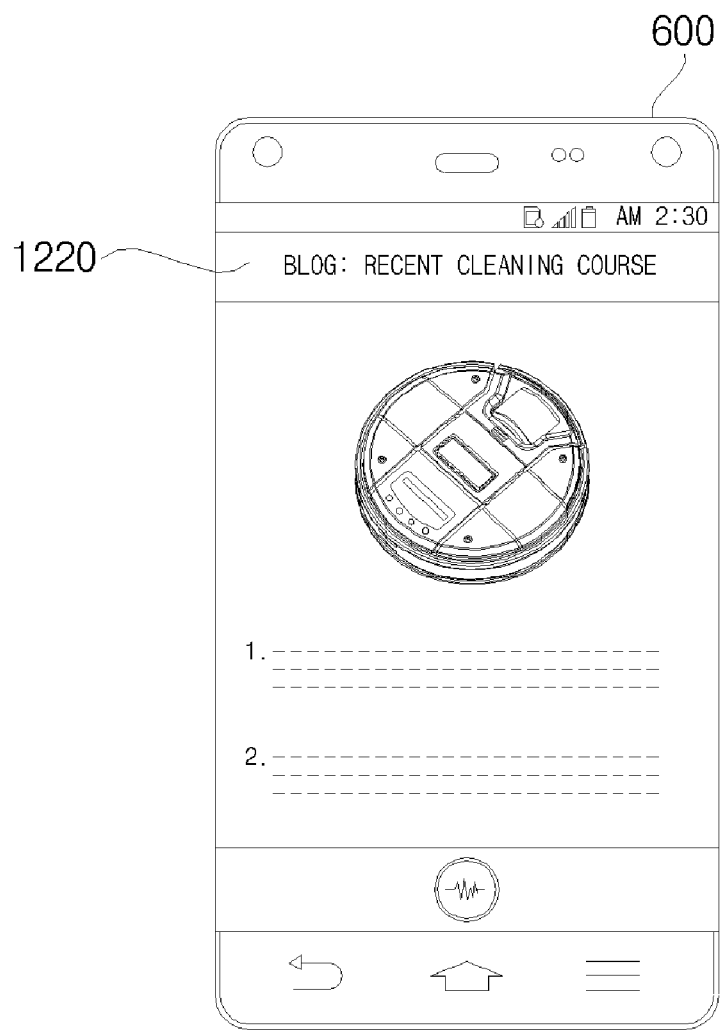

As shown in the figure, when the search term 1215 "Recent cleaning course" is inputted in the search window of the web page screen 710 for search, as shown in FIG. 12B, a "Recent cleaning course related screen" 1220 may be searched for and displayed.

The "Recent cleaning course related screen" 1220 of FIG. 12B may include images and text.

The controller 680 of the mobile terminal 600 may extract text from the "Recent cleaning course related screen" 1220 and analyze the text.

Figure 12C:

The controller 680 of the mobile terminal 600 performs signal processing with respect to user voice when voice 1230 of a user 700 "Recommended cleaning pattern?" is inputted via the microphone 623 as shown in FIG. 12C. Then, voice is recognized based on voice signal processing.

Figure 12D:
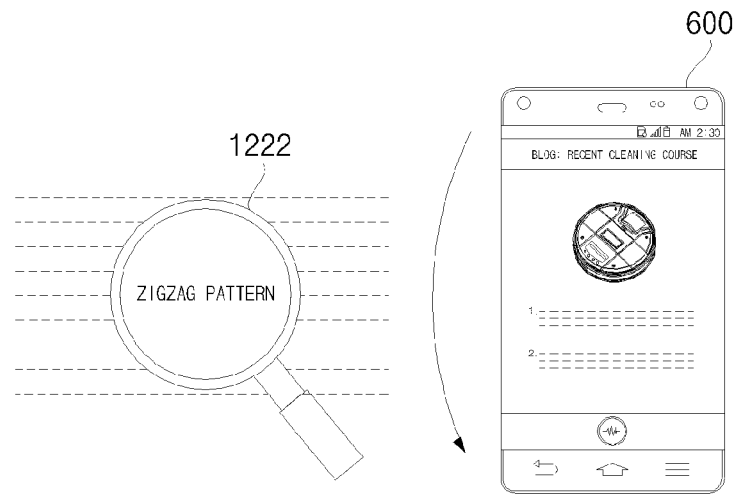

As shown in FIG. 12D, the controller 680 of the mobile terminal 600 may extract information 1222 corresponding to the voice 1230 of the user 700 "Recommended cleaning pattern?" from the text included in the "Recent cleaning course related screen" 1220. In the figure, information "zigzag pattern" 1222 is shown.

Figure 12E:
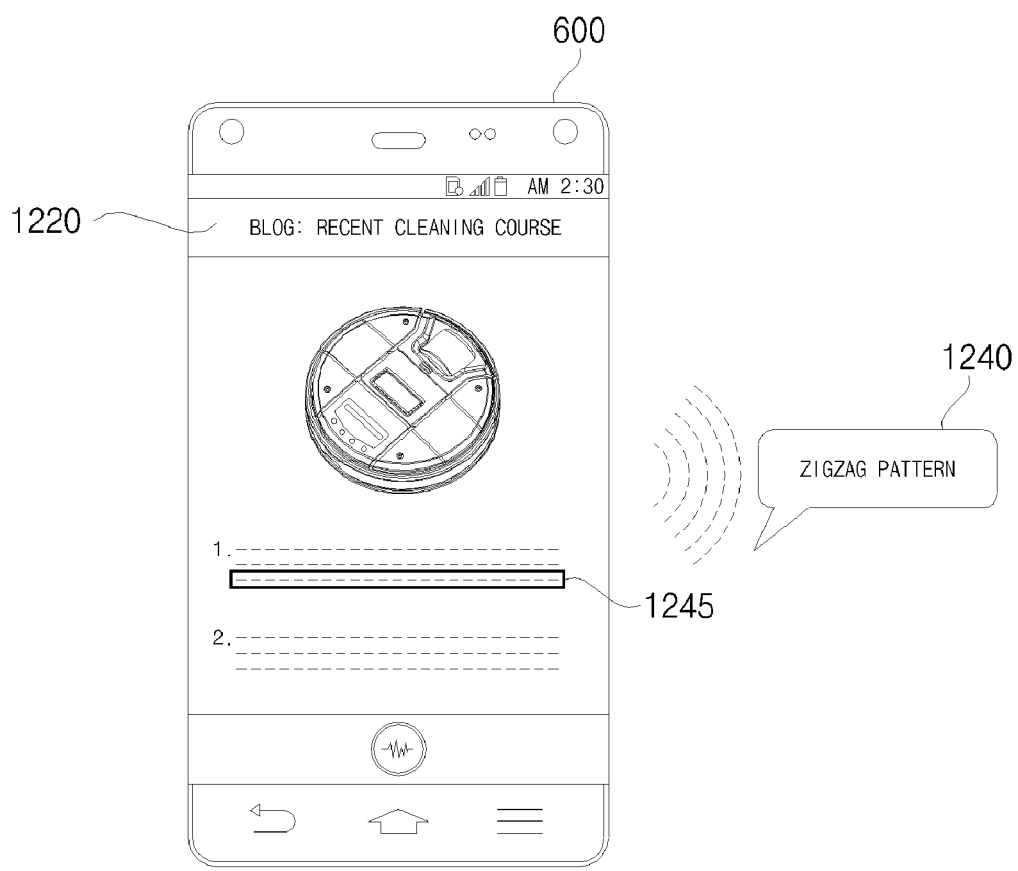

As shown in FIG. 12E, the controller 680 of the mobile terminal 600 may control output of sound 1240 "zigzag pattern" via the audio output module 653.

The user may conveniently acquire related information without touch operation of the mobile terminal 600. Accordingly, it is possible to increase user convenience.

As shown in FIG. 12E, the controller 680 of the mobile terminal 600 may control highlight and display of a region 1245 including information "zigzag pattern" of the "Recent recent cleaning course related screen" 1220 displayed on the display 651.

Figure 12F:
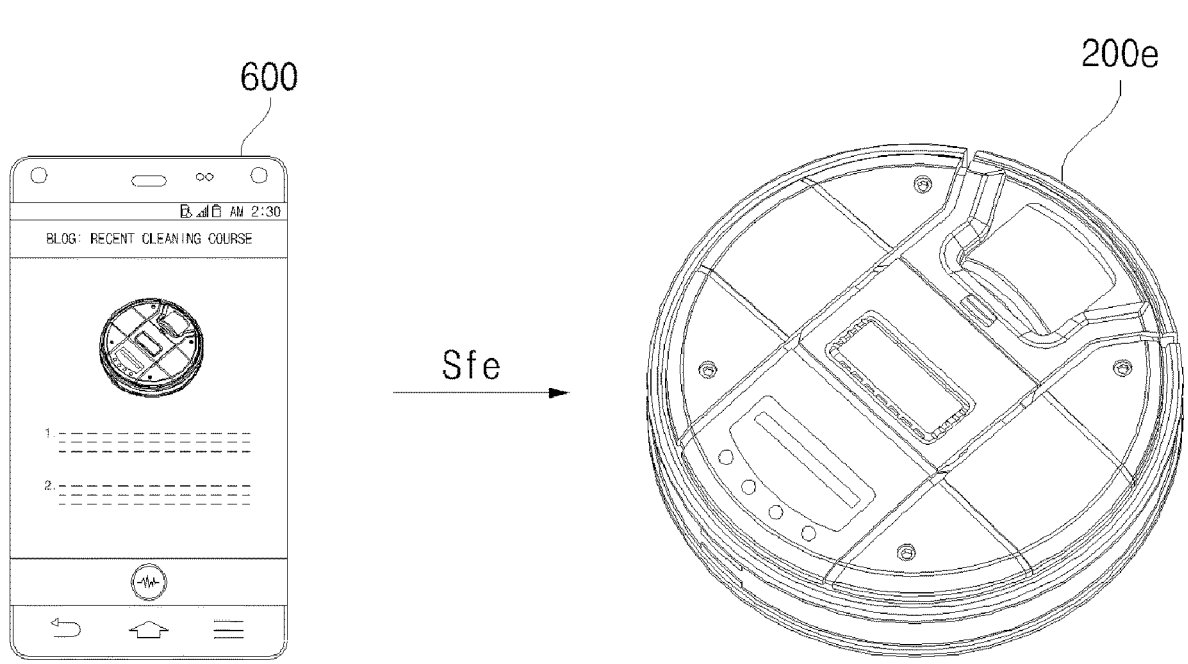

As shown in FIG. 12F, the controller 680 of the mobile terminal 600 may transmit the extracted information Sfe to the cleaner 200e via the communication unit 610.

The cleaner 200e may operate in a state of setting a cleaning mode to the zigzag pattern upon starting operation.

According to the embodiment of the present invention, since the terminal includes a microphone, a display, an audio output module, a communication unit to exchange data with a server or a home appliance, and a controller to control display of a screen including information related to the home appliance and to control output of information corresponding to user voice on the screen via the display or the audio output module when user voice is received via the microphone, it is possible to improve user convenience upon utilizing the home appliance.

Since information is extracted and outputted according to a voice command related to an interactive natural language, a user can conveniently acquire related information without touch operation of the terminal. Therefore, it is possible to increase user convenience.

For example, during cooking, a user can issue a command via voice and listen to information corresponding thereto via an audio output module. Accordingly, it is possible to improve user convenience.

The terminal and the home appliance system including the same according to the present invention are not restricted to the embodiments set forth herein. Therefore, variations and combinations of the exemplary embodiments set forth herein may fall within the scope of the present invention.

The method for operating the terminal or home appliance according to the present invention may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, optical data storage, and a carrier wave (e.g., data transmission over the Internet). The computer-readable recording medium may be distributed over a plurality of computer systems connected to a network so that computer-readable code is written thereto and executed therefrom in a decentralized manner. Functional programs, code, and code segments to realize the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A terminal comprising:
   a microphone;
   a display;
   an audio output module;
   a communication unit to exchange data with a server or a home appliance; and
   a controller to control the display, the audio output module, and communication unit,
   wherein the controller is configured to:
   execute web browser and display web page screen including search window,
   in response to input of a search term in search window,
   receive a web page screen or an application screen related to the search term through the communication unit, the web page screen or an application screen comprising information related to the home appliance,
   display the web page screen or the application screen comprising the information related to the home appliance on the display,
   analyze text included in the web page screen or the application screen using text recognition algorithm,
   when a natural-language voice regarding question is received via the microphone in a state of displaying the web page screen or the application screen comprising the information related to the home appliance, recognize the natural-language voice based on voice signal processing by voice recognition algorithm,
   extract information regarding answer corresponding to the natural-language voice from the extracted text included in the web page screen or the application screen received from the server, and
   output information regarding answer corresponding to natural-language voice based on the information related to the home appliance on the screen via the display or the audio output module,
   transmit the extracted information to the home appliance via the communication unit when the extracted information corresponds to operation course information of the home appliance.

2. The terminal according to claim 1, wherein the controller controls reception of the information related to the home appliance from the server and display of the screen including the received information related to the home appliance.

3. The terminal according to claim 1, wherein the controller controls accessing of a web page related to the home appliance, display of the web page screen and output of information regarding the answer corresponding to the natural-language voice on the web page screen via the display or the audio output module when the natural-language voice is received via the microphone.

4. The terminal according to claim 1, wherein the controller controls output of information regarding the answer corresponding to the natural-language voice on the application screen via the display or the audio output module when the natural-language voice is received via the microphone.

5. The terminal according to claim 1, wherein the controller controls display of the web page screen or the application screen related to cooking methods of a cooker as the home appliance, extraction of information related to a material from text included in the web page screen or the application screen when sound related to the material among the cooking methods is received via the microphone, and output of the extracted information related to the material.

6. The terminal according to claim 1, wherein the controller controls display of the web page screen or the application screen related to cooking methods of a cooker as the home appliance, extraction of information related to a cooking time or cooking pattern from text included in the web page screen or the application screen when sound related to the cooking time or cooking pattern of the cooker among the cooking methods is received via the microphone, and output of the extracted information related to the cooking time or cooking pattern.

7. The terminal according to claim 1, wherein the controller controls display of the web page screen or the application screen related to purchase of the home appliance, extraction of information related to a price of the home appliance from text included in the web page screen or the application screen when sound related to the price of the home appliance is received via the microphone, and output of the extracted information related to the price.

8. The terminal according to claim 1, wherein the controller controls display of the web page screen or the application screen related to an operation method of the home appliance, extraction of information related to an operation time or operation pattern from text included in the web page screen or the application screen when sound related to the operation time or operation pattern of the home appliance is received via the microphone, and output of the extracted information related to the operation time or operation pattern.

9. A home appliance system comprising:
a home appliance; and
a terminal to display a web page screen or an application screen comprising image and text including information related to the home appliance,
wherein the terminal is configured to:
execute web browser and display web page screen including search window,
in response to input of a search term in search window, receive a web page screen or an application screen related to the search term through the communication unit, the web page screen or an application screen comprising information related to the home appliance,
display the web page screen or the application screen comprising the information related to the home appliance,
analyze text included in the web page screen or the application screen using text recognition,
when a natural-language voice regarding question is received via the microphone in a state of displaying the web page screen or the application screen comprising the information related to the home appliance, recognize the natural-language voice based on voice signal processing by voice recognition algorithm,
extract information regarding answer corresponding to the natural-language voice from the extracted text included in the web page screen or the application screen received from the server, and
output information regarding answer corresponding to natural-language voice based on the information related to the home appliance on the screen via a display or an audio output module,
transmit the extracted information regarding answer corresponding to the natural-language voice to the home appliance when the extract information corresponds to operation course information of the home appliance.

10. The home appliance system according to claim 9, wherein the terminal accesses a web page related to the home appliance to display the web page screen and outputs information regarding the answer corresponding to the natural-language voice on the web page screen via the display or the audio output module.

11. The home appliance system according to claim 9, wherein the terminal outputs information regarding answer corresponding to the natural-language voice on the application screen via the display or the audio output module when the natural-language voice is received via the microphone.

12. The home appliance system according to claim 9, wherein the terminal displays the web page screen or the application screen related to cooking methods of a cooker as the home appliance, extracts information related to a material from text included in the web page screen or the application screen when sound related to the material among the cooking methods is received via the microphone, and outputs the extracted information related to the material.

13. The home appliance system according to claim 9, wherein the terminal displays the web page screen or the application screen related to cooking methods of a cooker as the home appliance, extracts information related to a cooking time or cooking pattern from text included in the web page screen or the application screen when sound related to the cooking time or cooking pattern of the cooker among the cooking methods is received via the microphone, and outputs the extracted information related to the cooking time or cooking pattern.

14. The home appliance system according to claim 9, wherein the terminal displays the web page screen or the application screen related to purchase of the home appliance, extracts information related to a price of the home appliance from text included in the web page screen or the application screen when sound related to the price of the home appliance is received via the microphone, and outputs the extracted information related to the price.

15. The home appliance system according to claim 9, wherein the terminal displays the web page screen or the application screen related to an operation method of the home appliance, extracts information related to an operation time or operation pattern from text included in the web page screen or the application screen when sound related to the operation time or operation pattern of the home appliance is received via the microphone, and outputs the extracted information related to the operation time or operation pattern.

* * * * *